(12) United States Patent
Walsh et al.

(10) Patent No.: US 11,941,895 B1
(45) Date of Patent: Mar. 26, 2024

(54) VEHICLE-BASED FACIAL RECOGNITION SYSTEM AND METHOD

(71) Applicant: Endera Corporation, Casper, WY (US)

(72) Inventors: John Joseph Walsh, Casper, WY (US); Zichu Ye, San Diego, CA (US)

(73) Assignee: Endera Corporation, Casper, WY (US)

( * ) Notice: Subject to any disclaimer, the term of this patent is extended or adjusted under 35 U.S.C. 154(b) by 393 days.

(21) Appl. No.: 17/220,871

(22) Filed: Apr. 1, 2021

(51) Int. Cl.
| | |
|---|---|
| *G06T 7/70* | (2017.01) |
| *G06N 20/00* | (2019.01) |
| *G06T 3/4007* | (2024.01) |
| *G06V 20/59* | (2022.01) |
| *G06V 40/16* | (2022.01) |
| *H04N 1/60* | (2006.01) |

(52) U.S. Cl.
CPC ........... *G06V 20/593* (2022.01); *G06N 20/00* (2019.01); *G06T 3/4007* (2013.01); *G06T 7/70* (2017.01); *G06V 40/161* (2022.01); *H04N 1/6008* (2013.01); *G06T 2207/20021* (2013.01); *G06T 2207/20081* (2013.01); *G06T 2207/30196* (2013.01); *G06T 2207/30242* (2013.01); *G06T 2207/30268* (2013.01)

(58) Field of Classification Search
CPC .... G06V 20/593; G06V 40/161; G06N 20/00; G06T 3/4007; G06T 7/70; G06T 2207/20021; G06T 2207/20081; G06T 2207/30196; G06T 2207/30242; G06T 2207/30268; H04N 1/6008

USPC .......................................................... 382/103
See application file for complete search history.

(56) References Cited

U.S. PATENT DOCUMENTS

| | | | |
|---|---|---|---|
| 2003/0043350 A1* | 3/2003 | Kitazawa | H04N 5/74 353/122 |
| 2014/0010478 A1* | 1/2014 | Ndiour | H04N 7/0142 382/300 |
| 2014/0254929 A1* | 9/2014 | Wu | H04N 19/146 382/166 |
| 2017/0140245 A1* | 5/2017 | Kraft | G06F 18/214 |
| 2021/0365343 A1* | 11/2021 | Lin | G06V 40/172 |

* cited by examiner

*Primary Examiner* — Stephen P Coleman
(74) *Attorney, Agent, or Firm* — Rutan & Tucker, LLP

(57) ABSTRACT

A headcount determination system is disclosed that includes a first camera and a processing unit configured to receive data communications that include an image frame captured by the first camera. The processing unit includes logic that, when executed by the processing unit, causes performance of operations including performing operations comprising a pre-processing phase including dividing the image frame into sub-frames, performing operations comprising an inference phase including scoring the sub-frames with a machine learning (ML) model, performing a threshold comparison with a score for each sub-frame and a threshold, and incrementing a headcount when the score satisfies the threshold comparison, and when the threshold comparison has been performed for the score for each sub-frame, providing the headcount as output. The operations further include performing a scaling operation on the image frame that adjusts a size of the image frame by a scaling factor.

17 Claims, 19 Drawing Sheets

VEHICLE-BASED FACIAL RECOGNITION SYSTEM AND METHOD

FIELD

Embodiments of the disclosure relate to the field of vehicle services, and more specifically, one embodiment of the disclosure relates to a passenger count determination platform that leverages facial recognition techniques to determine a passenger count for a multi-passenger vehicle.

GENERAL BACKGROUND

Multi-passenger transportation provides many benefits to individuals, communities, and the local economy. For example, while so much attention has been focused on the electric car movement, public transportation and other multi-passenger transportation services provide greater benefits in reducing air pollution and traffic congestion that have plagued certain cities, especially in those areas surrounding airports. However, there have been relatively few technological advances focused on multi-passenger transportation services recently than there have been on vehicles designed for personal or family use.

In addition, various concerns regarding the use of multi-passenger transportation services have contributed to a decline or stagnation in the utilization of such. For example, there are several unknowns when planning to utilize multi-passenger transportation services such as whether the multi-passenger transportation service will be operating in a timely manner, whether the necessary seating will be available upon entry of a multi-passenger vehicle and whether utilization of multi-passenger transportation service are safe.

For instance, a family may be hesitant to utilize a multi-passenger transportation service, such as a shuttle or bus, that has a passenger limit as there is an unknown as to whether each member of the family will be capable of boarding. Additionally, some persons with particular seating accommodation requirements, such as handicap accessible seating or wheelchair parking, may be hesitant to utilize a multi-passenger transportation service as such seating accommodation requirements may be unavailable at the time of boarding.

Further, there has been a hesitation by the public to utilize multi-passenger transportation services, especially in view of the COVID-19 pandemic. In particular, a larger segment of the population is now experiencing concerns about occupying enclosed spacing with persons unknown to them, as these persons may have the COVID-19 virus or another contagious illness such as the flu. These concerns have greatly impacted the use of multi-passenger transportation, including public transportation.

As greater use of multi-passenger transportation may assist in mitigating global climate change and overcrowded streets, a system is now needed to provide assurances to potential passengers that required seating accommodations and availability will be present at the time of boarding and that the use of such transportation poses little-to-no health risks.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
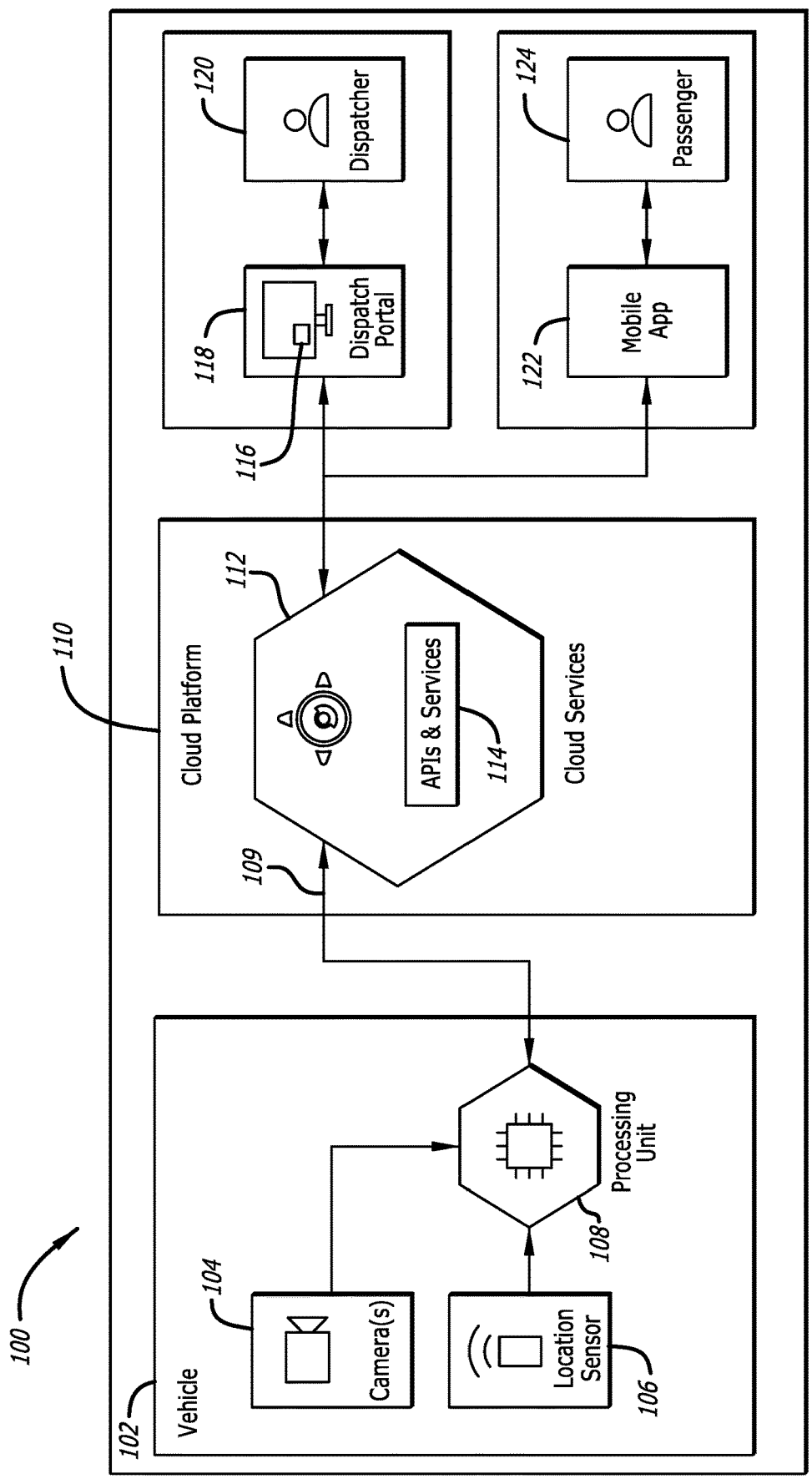
FIG. 1 is a first exemplary embodiment of a facial recognition-based vehicle operations platform in accordance with some embodiments.

According to one embodiment of the disclosure, a facial recognition-based vehicle operations platform is described. According to one embodiment of the disclosure, the facial recognition-based vehicle operations platform is deployed to provide for the ability to automatically determine a number of passengers on a multi-passenger vehicle through facial recognition techniques. Herein, according to one embodiment of the disclosure, the facial recognition-based vehicle operations platform features (i) a set of vehicle components, (ii) a cloud platform, (iii) a dispatch portal component, and (iv) a mobile application component.

In some embodiments, the set of vehicle components include one or more cameras disposed within a multi-passenger vehicle, one or more processing units that perform analyses on image frames captured by the one or more cameras, and, optionally, one or more telemetry data sensors. The analyses of an image frame result in a headcount of passengers included within the image frame. The headcount of passengers, i.e., the number of passengers on the multi-passenger vehicle, may be provided to the driver and/or may be utilized to provide an indication to potential passengers (e.g., via a display screen visible to potential passengers readying to board). Thus, potential passengers may be informed as to when the multi-passenger vehicle has reached (or is approaching) a passenger limit.

In some embodiments, the cloud platform receives a message (which may be referred to as a "heartbeat") from the processing unit of a multi-passenger vehicle, where the message includes information including the headcount, a timestamp, a vehicle identifier, and optionally, telemetry data.

Logic of the cloud platform, upon execution by one or more processors, may perform certain analyses on the information included within the message. Such analyses may include, but are not limited or restricted to, coordinating a subscription to an asynchronous messaging service, comparing each location indicator (e.g., a GPS heartbeat) of a vehicle with geo-fenced areas, where each geo-fenced area represents a vehicle stop, monitoring the stop events, and calculating the estimated time of arrival (ETA) of future stops for a vehicle.

The information included within the message, or a portion thereof, may be provided by the cloud platform to the dispatch portal component, which includes logic for, among other operations, generating and rendering display screens for a dispatcher or other technician. Examples of display screens that are generated and rendered include displays, for each multi-passenger vehicle deployed within a fleet, of a route, expected route completion time, average wait time at each passenger stop or terminal, current number of passengers, number of passengers that have indicated departure from the multi-passenger vehicle at each future stop, number of passengers that have reserved (or attempted to reserve) a seat for each future stop, etc. The dispatch portal component may also be configured to receive user input from a dispatcher or technician resulting in adjustment of a multi-passenger vehicle's route (e.g., instructions to adjust route may be transmitted to a real-time mapping component of the multi-passenger vehicle that is to be followed by the driver).

Additionally, information may be provided by the cloud platform and/or by the dispatch portal to a mobile application that is operating on a mobile device of a passenger or potential passenger. The information provided to the mobile application may provide real-time updates as to the location of a multi-passenger vehicle, provide a current number of empty seats on the multi-passenger vehicle, provide an estimated time until arrival at various stops or terminals along the route of the multi-passenger vehicle, etc. Additionally, the mobile application may be configured to receive user input corresponding to a reservation of one or more seats on a particular multi-passenger vehicle. In some embodiments, pre-payment for the reservation of each seat may occur directly through the mobile application. In some embodiments, only a single seat may be able to be reserved. However, in other embodiments, the mobile application may be configured to accept reservation of multiple seats for particular mobile application accounts (e.g., accounts that have been verified to belong to a parent so that the parent may reserve a seat for a child).

Additionally, advertisements may be displayed within mobile applications where an advertisement may be "targeted" to certain criteria pertaining to the passenger or potential passenger. Further, when the mobile application is utilized to reserve a seat on the multi-passenger vehicle, a targeted advertisement may be displayed to the passenger via a display corresponding to the reserved seat (e.g., on a display screen integrated into the seat, headrest (or otherwise) directly in front of the reserved seat.

I. Terminology

In the following description, certain terminology is used to describe aspects of the invention. In certain situations, the terms "unit" and "component" are representative of hardware, firmware, and/or software that is configured to perform one or more functions. As hardware, the unit (or component) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial elements (AND gates, OR gates, NOR gates, NAND gates, or the like).

Alternatively, or in combination with the hardware circuitry described above, the unit (or component) may be software in the form of one or more software modules. The software modules may include an executable application, a daemon application, an application programming interface (API), a subroutine, a function, a procedure, a plug-in, an applet, a servlet, a routine, source code, a shared library/ dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

A "vehicle" generally refers to a multi-passenger conveyance such as an automotive conveyance (e.g., shuttle van, a bus, a limousine, etc.) an airplane, a train, or the like. The automotive conveyance may be a low-emission, plug-in vehicle such as an electric shuttle, electric bus, or the like. However, it is contemplated that the conveyances may include an internal combustion engine.

The term "message" generally refers to signaling (wired or wireless) such as information placed in a prescribed format for transmission (or access) in accordance with a suitable delivery protocol or a suitable logical data structure such as an Application Programming Interface (API). Various examples of delivery protocols may include, but are not limited or restricted to HTTP (Hypertext Transfer Protocol); HTTPS (HTTP Secure); Simple Mail Transfer Protocol (SMTP); iMESSAGE; or Instant Message Access Protocol (IMAP). Examples of logical data structures may include HTTP APIs. Each message may be in the form of one or more packets, frames, or any other series of bits having the prescribed, structured format.

The term "meta-information" generally refers to a collection of information associated with the primary data included in the message.

The term "computerized" generally represents that any corresponding operations are conducted by hardware in combination with software and/or firmware. The term "concurrently" generally represents two operations being performed at least partially overlapping in time. Also, in certain instances, the terms "compare," "comparing," "comparison," or other tenses thereof generally mean determining if a match (e.g., identical or a prescribed level of correlation) is achieved between two items.

The term "transmission medium" generally refers to a physical or logical communication link (or path) between two units such as a camera device and a processing unit deployed within a vehicle. For instance, as a physical communication path, wired and/or wireless interconnects in the form of electrical wiring, optical fiber, cable, bus trace, or a wireless channel using infrared or radio frequency (RF), may be used. The logical communication link may be any software-to-software communication scheme that supports communications between multiple (two or more) software modules or running processes.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Facial Recognition-Based Vehicle Operations Platform

Referring now to FIG. 1, a first exemplary embodiment of a facial recognition-based vehicle operations platform is shown in accordance with some embodiments. The facial recognition-based vehicle operations platform 100 of FIG. 1 is shown to include a plurality of components that interact and communicate with one other for various purposes as will be described in detail below. In some embodiments, the facial recognition-based vehicle operations platform 100 includes components disposed of within a vehicle 102, which may be a multi-passenger vehicle such as a shuttle or bus. In particular, the components disposed within the vehicle 102 include one or more cameras 104, a location sensor 106 (such as a Global Navigation Satellite System (GNSS) sensor or a Global Positioning System (GPS) sensor)) and a processing unit 108.

In some embodiments, the processing unit 108 may include a single processor, while in other embodiments, the processing unit 108 may include a plurality of processors. In some embodiments, the processing unit 108 may further include non-transitory, computer-readable medium (storage), or at least have access to such. The processing unit 108 may be disposed in various locations within the vehicle 102 and, in some embodiments, image frames captured by the one or more cameras 104 are obtained by the processing unit 108 via wired or wireless communication. As should be understood, the data obtained by the processing unit 108 may include a camera identifier of the camera 104. The operations performed by the processing unit 108 on each image frame are discussed in detail below. The output 109 from the processing unit is provided to cloud services 112 and may include a headcount for the vehicle 102 along with telemetry data, which may include, but is not limited or restricted to, location data obtained from the location sensor 106, a time stamp, a vehicle identifier, an acceleration of the vehicle 102 and/or a speed of the vehicle 102. In some embodiments, the output (or communication) 109 may be a Message Queuing Telemetry Transport (MQTT) heartbeat with a payload that includes the determined headcount of the vehicle 102 and the telemetry data.

The facial recognition-based vehicle operations platform 100 also includes the cloud services 112, which comprises logic configured to be stored and executed on the cloud platform 110, where the cloud platform 110 represents hardware and/or software such as data storage ("cloud storage") and computing power that is accessible via a network, e.g., the internet. The logic of the cloud services 112 may include the application programming interfaces (APIs) and related services (collectively, APIs) 114.

One example of an operation performed by the cloud services 112 includes coordinating a subscription to an asynchronous messaging service. Coordinating the subscription may include managing messages sent from a resource and entering the content of the messages into one or more databases. For example, a resource may correspond to a vehicle and the messages may correspond to the output from the processing unit 108 and/or location data obtained from the location sensor 106. More particularly, in one example, the APIs 114 may obtain (via push or pull methods) a heartbeat communication from the processing unit 108 at regular intervals (e.g., every second). The heartbeat communication may include information such as a headcount as determined by the processing unit 108, a timestamp, a vehicle identifier, and optionally, telemetry data.

An additional example of an operation performed by the cloud services 112 includes comparing each location indicator (e.g., a GPS heartbeat) of a vehicle with geo-fenced areas each comprising a vehicle stop, where the GPS heartbeat may be included within the heartbeat communication as part of the telemetry data. When the comparison indicates that the vehicle is within a geo-fenced area, the cloud services 112 adds a "stop event" to route information of the vehicle. Yet another example of an operation performed by the cloud services include monitoring the stop events, and calculating the estimated time of arrival (ETA) of future stops for a vehicle. For example, the cloud services 112 may obtain location data from the vehicle 102, access traffic information (such as publicly available data through APIs such as the GOOGLE® Maps Distance Matrix API) and determine the estimated time of arrival (ETA) of the vehicle 102 at a future stop based on the current location of the vehicle 102, traffic information, and historical runtime patterns. Further, the APIs 114 are configured to enabling data to be created, read, updated and deleted.

Figure 7:
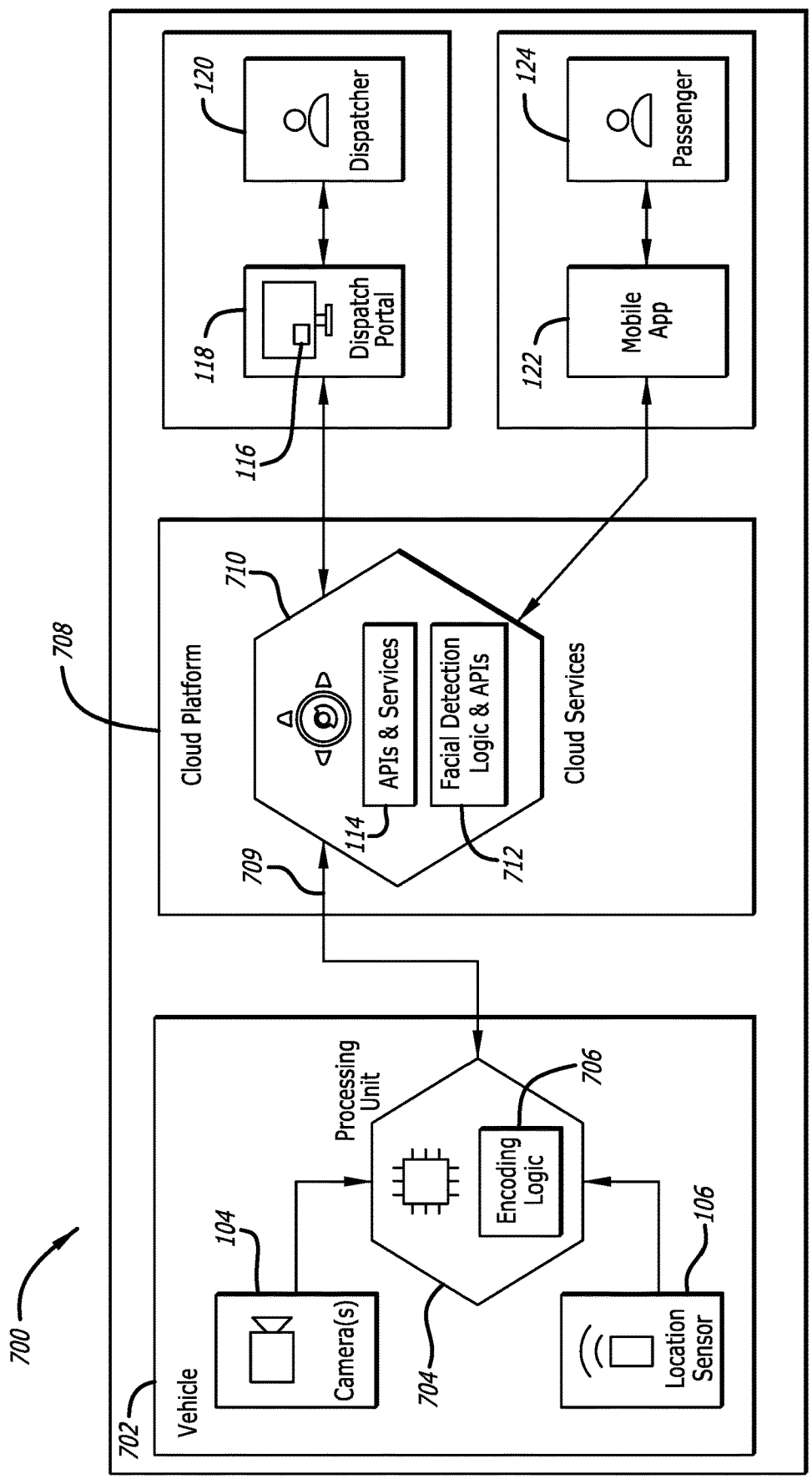
FIG. 7 illustrates a second exemplary embodiment of a facial recognition-based vehicle operations platform in accordance with some embodiments.

Additionally, in some embodiments as shown in FIG. 7, the cloud services may also include additional logic and APIs ("facial detection logic and APIs) that enable processing of an image frame on the cloud platform instead of relying on processing by the processing unit 108.

FIG. 1 also illustrates that the cloud services 112 may communicate with a dispatch portal 118 having stored thereon on logic comprising a dispatch portal platform 116. The dispatch portal 118 may be a networking device, such as a desktop computer, a laptop, a tablet or other mobile device, etc. The logic of the dispatch portal 118 may receive data from the cloud services 112 and, in response thereto, cause the rendering of certain Graphical User Interfaces (GUIs) that are viewable by a dispatcher 120 and provide information pertaining to the route of the vehicle 102 and the headcount of passengers of the vehicle 102 at various points along its route. The information pertaining to the route of the vehicle 102 may include real-time location information (e.g., from the location sensor 106), estimated time of arrival at each future stop along its route, traffic information along the route (e.g., sourced or retrieved from public data sources such as GOOGLE MAPS™), etc.

In some embodiments, the logic of the dispatch portal 118 may receive information from the cloud services 112 pertaining to a reservation system, and specifically, a reservation status for each seat on the vehicle 102 (e.g., currently reserved and occupied, reserved for future occupation at future stop, currently reserved and occupied until future stop, etc.). As will be discussed below, the facial recognition-based vehicle operations platform 100 may include a mobile application 122 that is configured to be installed and executed on a network device of a passenger or potential passenger 124. The terms "passenger" and "potential passenger" will be used below based on the situation. For example, when referring to a person that has currently boarded a vehicle, the term "passenger 124" will be used, and when referring to a person that is attempting to reserve a seat on a vehicle or is waiting to board a vehicle, the term "potential passenger 124" will be used.

The mobile application 122 may provide a potential passenger 124 a way to obtain information as to a vehicle's status (location, estimated time of arrival at a particular future stop, current capacity (headcount), seats reserved for future stops, etc.). Additionally, the mobile application 122 may be configured to receive user input that provides the potential passenger 124 the ability to reserve a seat on a particular vehicle at a particular stop.

These other features will be discussed below in conjunction with the drawings. The various embodiments discussed need not include all features disclosed herein or all of the features illustrated in a particular drawing.

III. In-Vehicle Camera Configurations

Figure 2A:
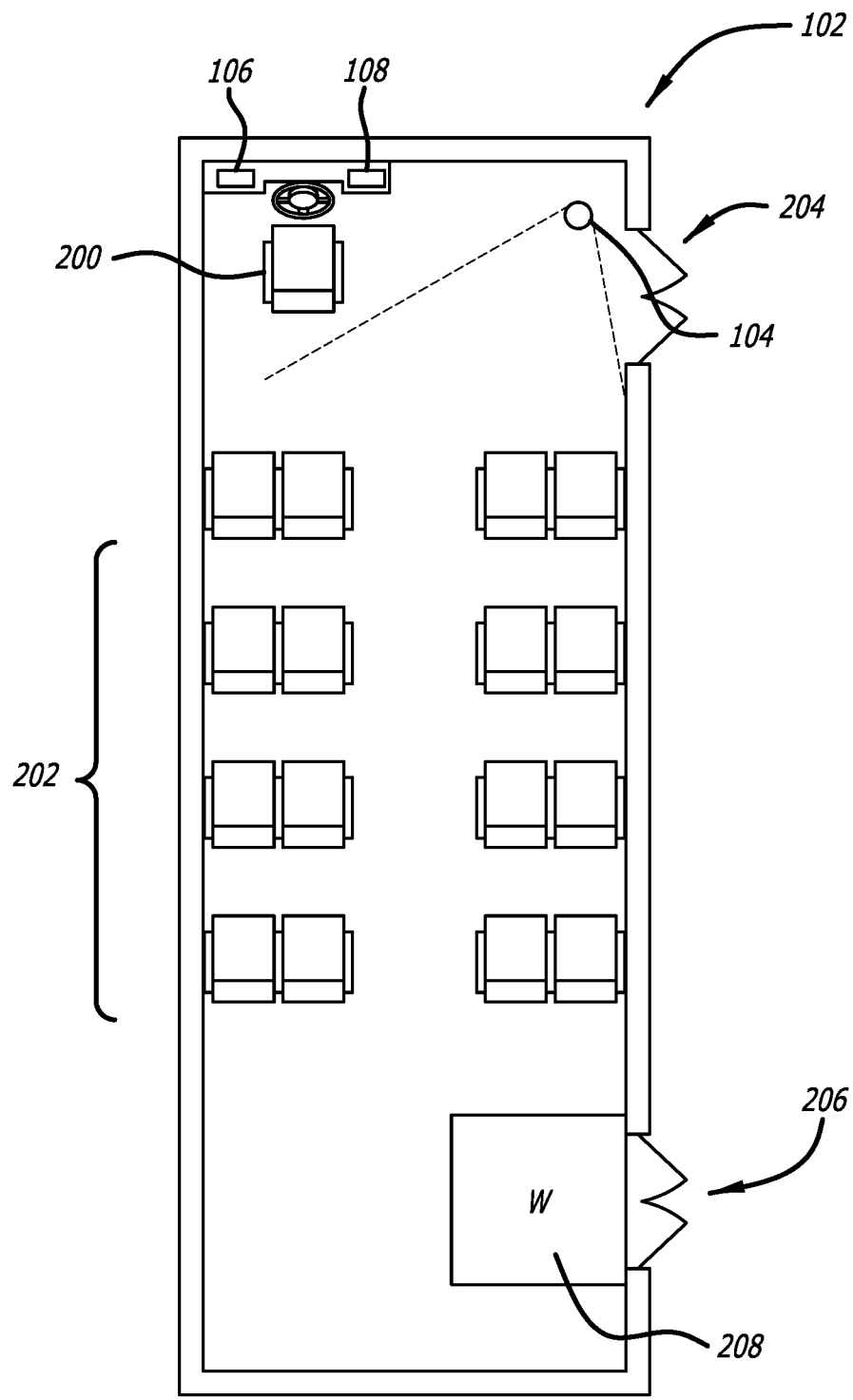
FIG. 2A is a first embodiment of a positioning of a camera of the facial recognition-based vehicle operations platform of FIG. 1 within a multi-passenger vehicle in accordance with some embodiments.

Referring to FIG. 2A, a first embodiment of a positioning of a camera of the facial recognition-based vehicle operations platform of FIG. 1 within a multi-passenger vehicle is shown in accordance with some embodiments. FIG. 2A provides for one embodiment in which a camera 104 of the facial recognition-based vehicle operations platform 100 is deployed within the vehicle 102. In some embodiments, the camera 104 includes an ultra-wide-angle lens, such as a fish lens. As shown, the vehicle 102 includes a driver seat 200 (driver not shown), a plurality of seats 202, a front door 204, a rear door 206 and wheelchair access/parking 208.

In this embodiment, the camera 104 is deployed at the front of the vehicle 102 and is rear-facing. As shown, the camera 104 may capture each of the plurality of seats 202. Thus, following entry or boarding of the vehicle 102 by a passenger and seating of the passenger, an image frame captured by the camera 104 would include the seated passenger. FIGS. 6A-6D illustrate an image frame captured by a rear-facing camera such as the camera 104 in this embodiment that is deployed (or "positioned") at the front of the vehicle 102.

Figure 2B:
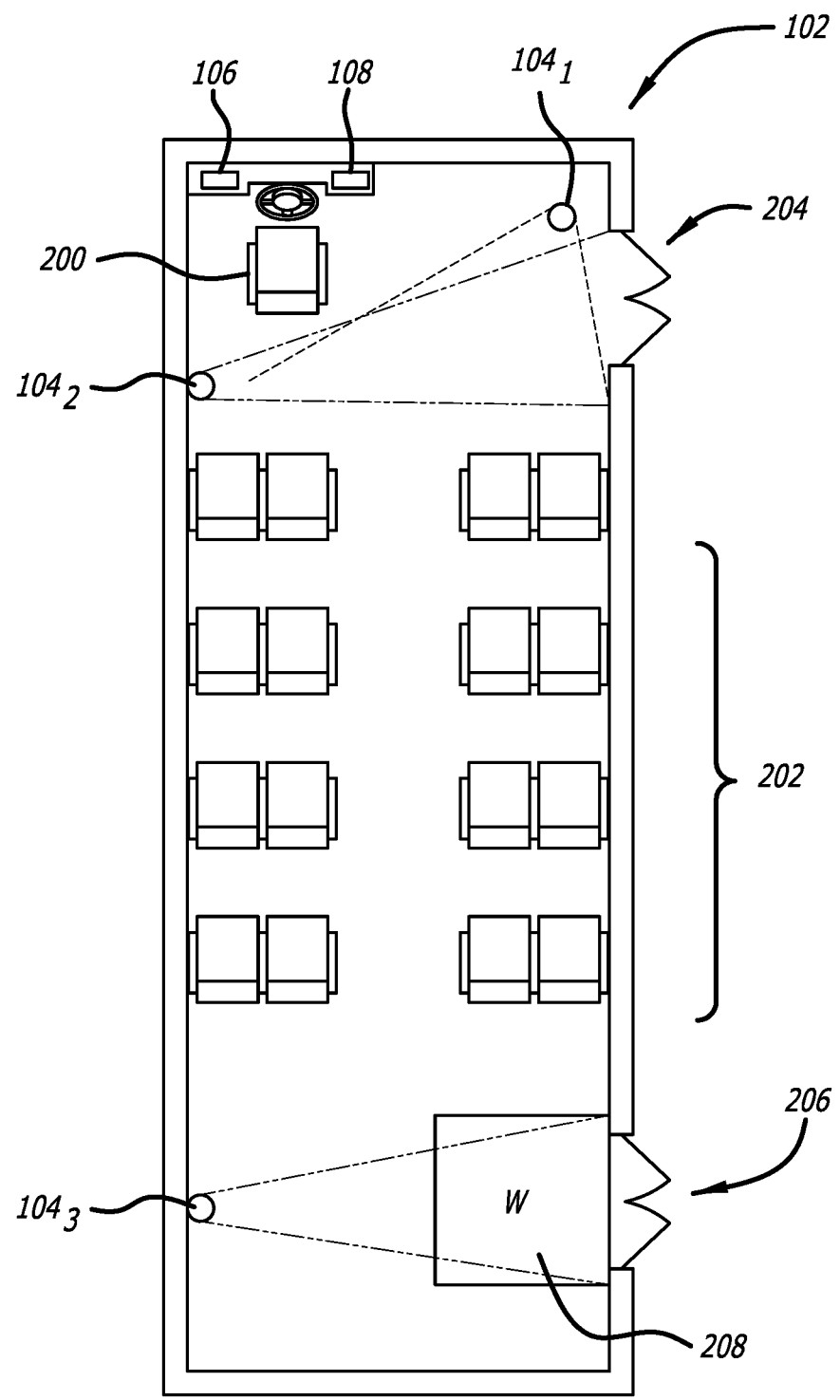
FIG. 2B is a second embodiment of a positioning of a plurality of camera of the facial recognition-based vehicle operations platform of FIG. 1 within a multi-passenger vehicle in accordance with some embodiments.
Figure 2C:
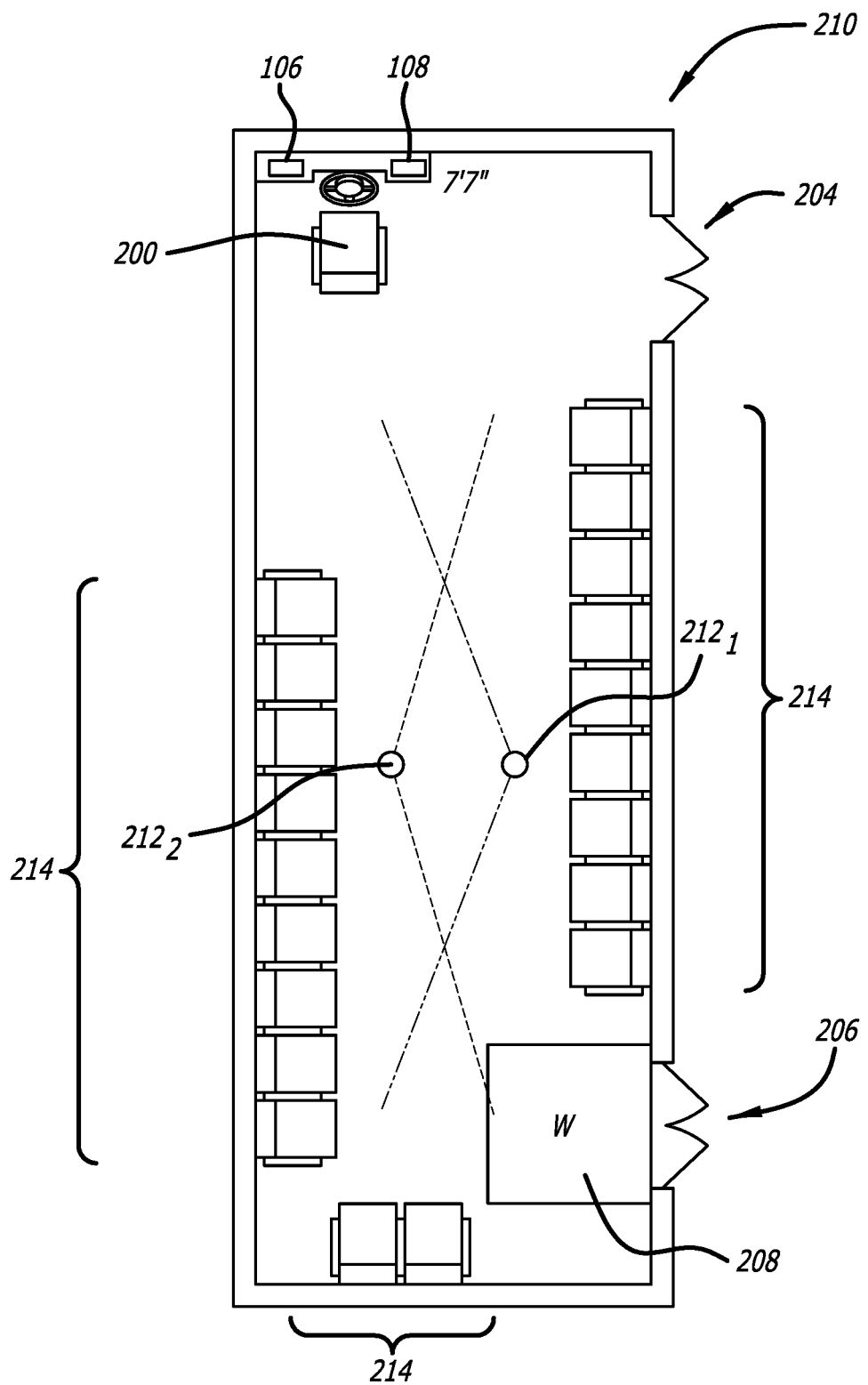
FIG. 2C is a third embodiment of a positioning of a plurality of camera of the facial recognition-based vehicle operations platform of FIG. 1 within a multi-passenger vehicle in accordance with some embodiments.
Figure 2D:
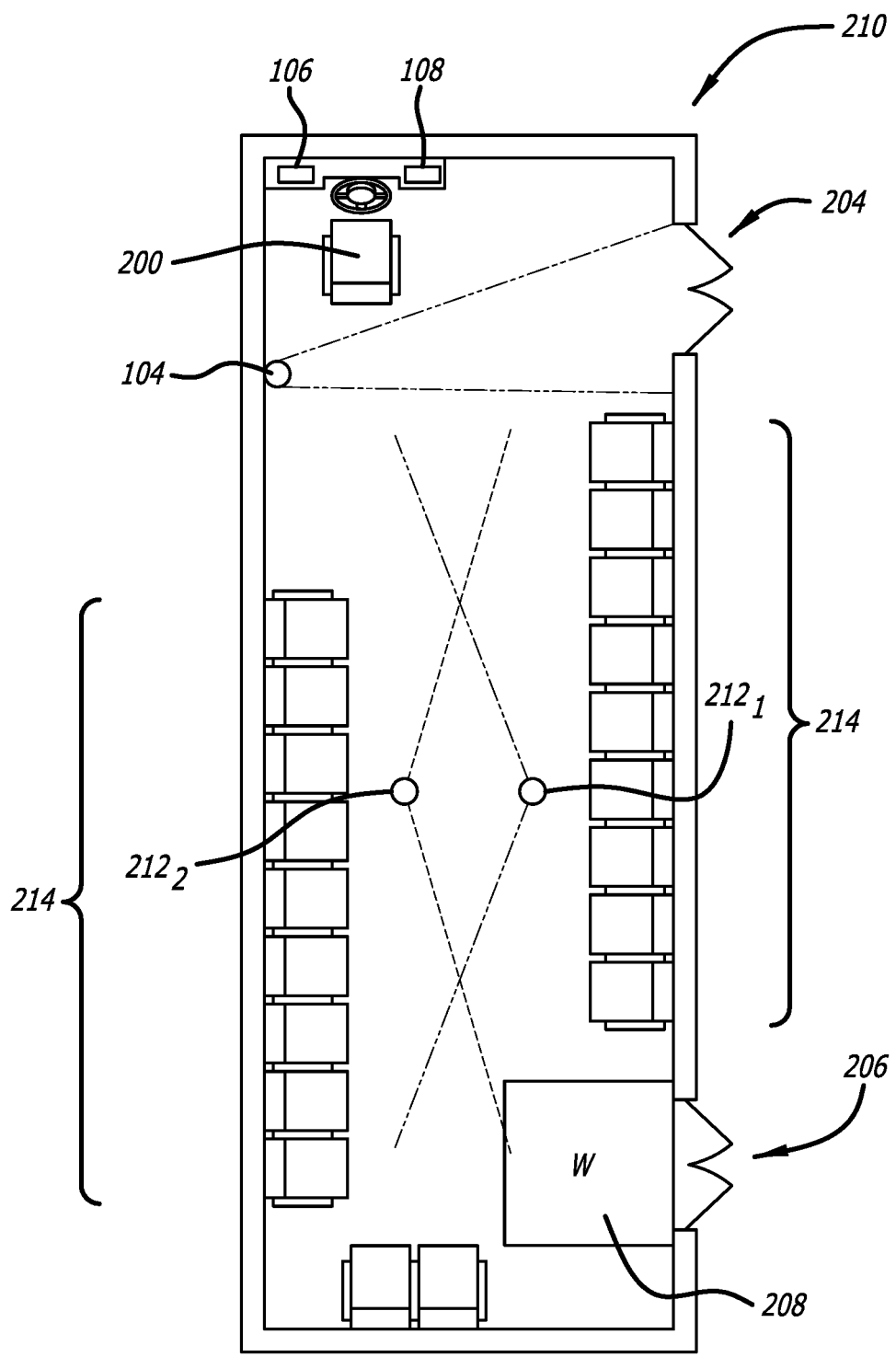
FIG. 2D is a fourth embodiment of a positioning of a plurality of camera of the facial recognition-based vehicle operations platform of FIG. 1 within a multi-passenger vehicle in accordance with some embodiments.

Additionally, the vehicle 102 is shown to include the processing unit 108. As will be discussed below, the processing unit 108 is configured to receive image frames captured by any of the cameras discussed here, e.g., any of the cameras $104_1$-$104_i$ as seen in FIGS. 2A-2B and 2D, or any of the cameras $212_1$-$212_j$ as seen in FIGS. 2C-2D. Operations of the processing of captured images performed by the processing unit 108 is discussed in detail below, at least with respect to FIGS. 3-6D.

In some embodiments, an image frame captured by the camera 104 may include the driver (occupying the driver's seat 200). When processing such image frames, the processing unit 108 may detect the driver, and bypass the driver in the headcount determination. For example, the driver's positioning may be detected compared to the passengers' positioning and bypassed (e.g., not included) in the headcount determination.

Referring to FIG. 2B is a second embodiment of a positioning of a plurality of camera of the facial recognition-based vehicle operations platform of FIG. 1 within a multi-passenger vehicle is shown in accordance with some embodiments. FIG. 2B provides for one embodiment in which a plurality of cameras $104_1$-$104_i$ ($i \geq 1$, where i=3 for this embodiment) of the facial recognition-based vehicle operations platform 100 are deployed within the vehicle 102. As shown, the vehicle 102 includes the same features as in FIG. 2A.

In this embodiment, a first camera $104_1$ is deployed at the front of the vehicle 102 and is rear-facing. This camera is consistent with the operability and functionality of the camera 104 of FIG. 2A. Additionally, a second camera $104_2$ is deployed near the front of the vehicle 102 in a position facing the front door 204. The second camera $104_2$ may operate to capture image frames including silhouettes of passengers boarding the vehicle 102 through the front door 204.

Due to the positioning of the cameras $104_1$-$104_2$ and the seating configuration, the camera $104_2$ is better situated to capture the silhouette of each passenger in FIG. 2B as she or he boards the vehicle 102. As a result, the images captured by the camera $104_1$ may be deemed the images for the headcount determination and the images captured by the camera $104_2$ may be used to count a number of people entering (or potentially exiting) the vehicle 102. In some embodiments, the processing unit 108 may receive an image frame from the camera $104_2$, perform an image segmentation process in which the passenger's head is segmented from the silhouette, where each detected head is recorded. The processing unit may maintain this number (e.g., to determine a total number of passengers entering the vehicle 102 during a given time period). In some embodiments, a similar process may be performed for passengers leaving the vehicle 102, where the back of a head is detected and segmented from the exiting passenger's silhouette. In instances in which heads are segmented from silhouettes of passengers entering and exiting the vehicle 102, a running tally may be maintained that indicates the number of passengers currently on the vehicle 102 (e.g., adding the number of passengers entering and subtracting the number of passengers exiting). This running tally may then be compared against the headcount determined from analysis of an image frame captured by the camera $104_1$.

Further, a third camera $104_3$ is deployed near the rear of the vehicle 102 in a position facing the rear door 206. The second camera 104₃ may operate to capture image frames of passengers boarding the vehicle 102 through the rear door 206. In some embodiments, the third camera 104₃ is positioned to capture image frames of the wheelchair access/parking 208. The third camera 104₃ may also capture passengers boarding through the rear door 206 as well as identify the presence of a wheelchair. As should be understood, the process described above with respect to image segmentation may be equally applied to image frames captured by the camera 104₃ and the running tally of passengers currently boarded on the vehicle 102 may be adjusted accordingly.

Referring to FIG. 2C is a third embodiment of a positioning of a plurality of camera of the facial recognition-based vehicle operations platform of FIG. 1 within a multi-passenger vehicle is shown in accordance with some embodiments. FIG. 2C provides for one embodiment in which a plurality of cameras $212_1$-$212_j$ (j≥1, where j=2 for this embodiment) of the facial recognition-based vehicle operations platform 100 are deployed within the vehicle 210. As shown, the vehicle 210 includes many of the same features as in FIG. 2A. However, the seating arrangement of the vehicle 210 includes a perimeter seating configuration in contrast to the front-facing seating configuration of vehicle 102 of FIGS. 2A-2B.

In this embodiment, first and second cameras $212_1$-$212_2$ are deployed near a center of the vehicle 210. In some embodiments, each of the first and second cameras $212_1$-$212_2$ includes an 80° fish-eye lens, where each camera is pointed downward to capture half or substantially half of the vehicle 210 in a single image frame. In such embodiments, the combination of the image frames captured by the first and second cameras $212_1$-$212_2$ at a given time provide a view of the plurality of the seats 214 and the wheelchair access/parking 208. In embodiments where the first and second cameras $212_1$-$212_2$ include an 180° fish-eye lens, additional pre-processing operations may be performed by the processing unit 108 on images captured by such relative to the pre-processing operations performed on the images captured by the cameras $104_1$-$104_3$. The pre-processing operations will be discussed in more detail below at least with respect to FIGS. 3-5B. However, to note here, the pre-processing operations performed on the images captured by the 180° fish-eye lens may include distortion correction (or adjustment) operations due to the distorted frames captured by 180° fish-eye lenses.

Additionally, in some embodiments, the second camera 212₂ may be positioned to capture an image frame that includes the front door 204 and the rear door 206, thereby providing for the ability to count the number of persons that board the vehicle 210.

Referring to FIG. 2D is a fourth embodiment of a positioning of a plurality of camera of the facial recognition-based vehicle operations platform of FIG. 1 within a multi-passenger vehicle is shown in accordance with some embodiments. FIG. 2D provides for an embodiment that combines the embodiments of FIGS. 2B-2C such that at least one camera 104 is utilized in conjunction with at least one ultra-wide-angled lens 212.

IV. Facial Recognition-Based Headcount Determination Platform

Figure 3:
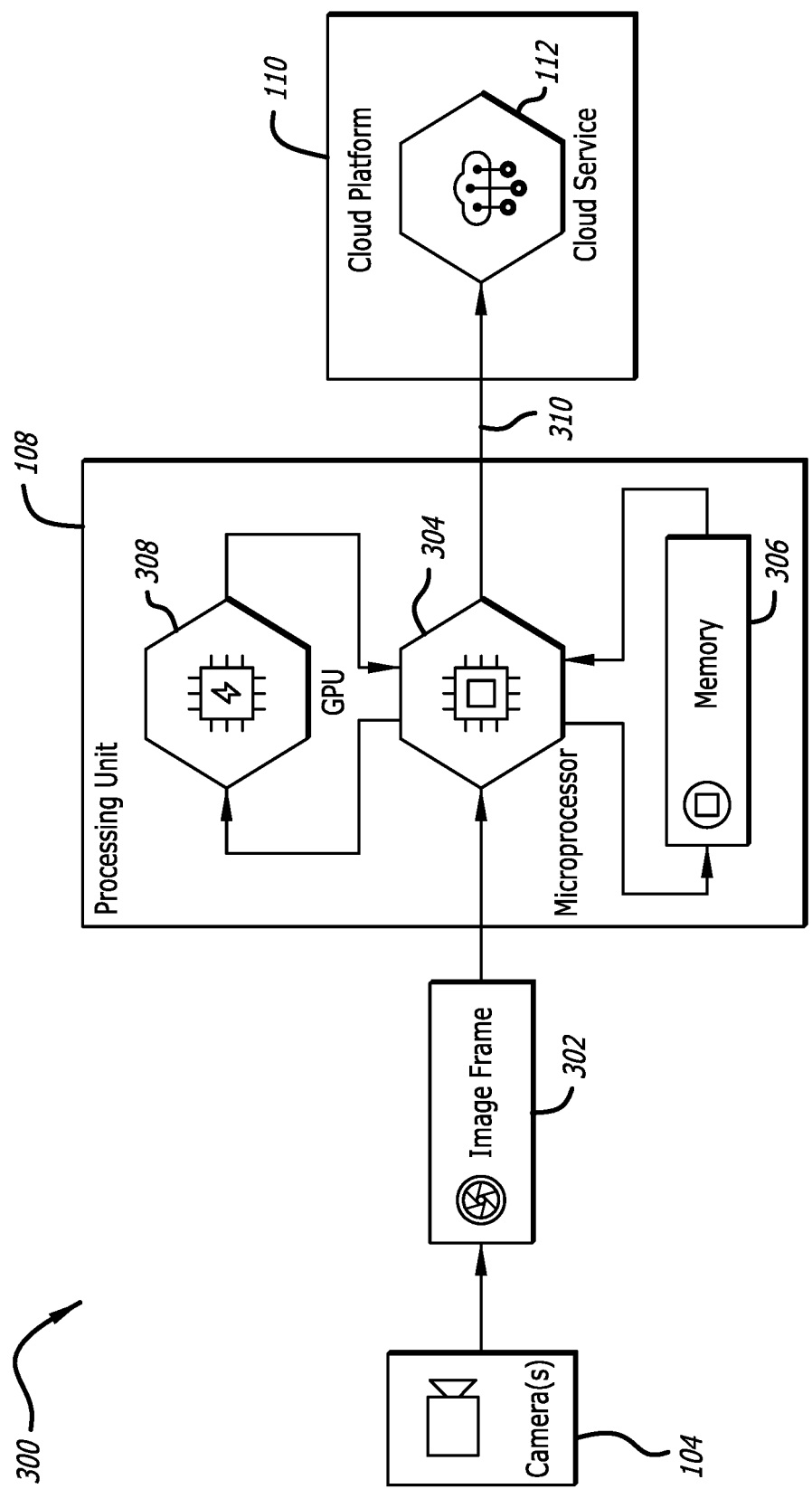
FIG. 3 is an exemplary embodiment of components of the facial recognition-based vehicle operations platform of FIG. 1 utilized in determining a headcount of a multi-passenger vehicle in accordance with some embodiments.

Referring now to FIG. 3 is an exemplary embodiment of components of the facial recognition-based vehicle operations platform of FIG. 1 utilized in determining a headcount of a multi-passenger vehicle is shown in accordance with some embodiments. FIG. 3 provides a more detailed illustration of certain components of FIG. 1. In particular, FIG. 3 focuses on the components of the facial recognition-based vehicle operations platform that result in the determination of a headcount of passengers of the vehicle 102 at a given time. In particular, FIG. 3 illustrates a flow where a camera 104 that is configured to capture an image frame 302 and provide such the processing unit 108. Alternatively, the processing unit 108 may retrieve the image frame 302. Namely, the processing unit 108 may obtain the image frame 302 via either a push or pull method.

As is shown, the processing unit 108 includes a microprocessor 304, memory 306 (e.g., non-transitory, computer-readable medium), and a graphics processing unit (GPU) 308 having a plurality of processing cores (e.g., tens, hundreds or even thousands). For instance, the plurality of processing cores of the GPU 308 may be Compute Unified Device Architecture (CUDA) cores from NVIDIA® or Stream Processors from AMD®.

In some embodiments, the microprocessor 304 of the processing unit 108 obtains the input frame 302, which is then provided to the GPU 308 for processing. Upon receipt, the image frame 302 may be stored on the memory 306. The processing performed by the GPU 308 may include a pre-processing phase, which prepares the image frame 302, or a portion thereof, to be provided to a trained machine-learning (ML) model for scoring. The pre-processing phase may be comprised of analyzing whether the color channel ordering of the image frame 302 to determine the ordering is in accordance with the color channel ordering required by the ML model. When the color channel ordering of the image frame 302 is not as is required by the ML model, the pre-processing phase includes performing a channel swap to rearrange the color channels. For example, when the ML model requires a color channel ordering of red-green-blue (RGB) and the image frame 302 includes a color channel ordering blue-green-red (BGR), the pre-processing phase includes swapping the color channels from BGR to RGB.

The pre-processing phase may also include a scaling methodology, which will be discussed in detail below at least with respect to FIGS. 5A-6D. As an overview, an image frame may be scaled based on the requirements of the ML model that will be scoring the image frame. In some embodiments, the scaling may comprise a two stage process where the first stage comprises determining the required size of an image frame to be provided as input to the ML model, determining a scaling factor for the received image frame 302 based on the required size, and scaling the received image frame 302 by the scaling factor. The second stage comprises dividing the scaled imaged frame into sub-frames, where each sub-frame corresponds to the required size of an image frame to be provided as input to the ML model.

The scaling methodology enables the processing unit 108 to receive an image frame that is larger (or smaller) than the size required by the ML model. In most instances, the received image frame 302 is much larger than the size required by the ML model. Thus, in order to provide proper inputs to the ML model for scoring, the received image frame 302 is divided into several sub-frames (as seen in FIGS. 6A-6D).

The interpolation process comprises operations in scaling the received image frame 302 (or the subsequently formed sub-frames). The interpolation process may be utilized to upscale or downscale an image frame.

Once the pre-processing phase is completed (or has generated one or more sub-frames), the one or more sub-frames are provided to the ML model for scoring. In some embodiments, the ML model may begin scoring sub-frames prior to the completion of the entire scaling process.

The ML model provides as output, for each sub-frame, a score that is indicative of whether the sub-frame includes a single face. The score of a sub-frame may then be compared to a predetermined threshold such that satisfaction of the threshold comparison results in an indication as to whether the sub-frame includes a single face. For instance, the score meeting or exceeding the predetermined threshold may indicate that the sub-frame includes a single face. However, in other embodiments, the score falling below the predetermined threshold may indicate that the sub-frame includes a single face. Based on the number of sub-frames that satisfy the threshold comparison, the processing unit 108 provides, as output 310, a headcount included within the received image frame 302. The output 310 may be provided to the cloud services 112.

In some embodiments, clusters or groupings of neighboring sub-frames may be formed where the scores of the neighboring sub-frames within the cluster are compared to each other (similar to the concept of the heatmap described above). A convergent score determined for a cluster of sub-frames is then compared against the threshold. When the convergent score satisfies the threshold comparison, the processing unit 108 indicates that the sub-frames included within the cluster include a face, the headcount is incremented. It should be understood that multiple clusters may include overlapping portions of sub-frames, which assists in detection of partially overlapping faces within a captured image frame.

Figure 4:
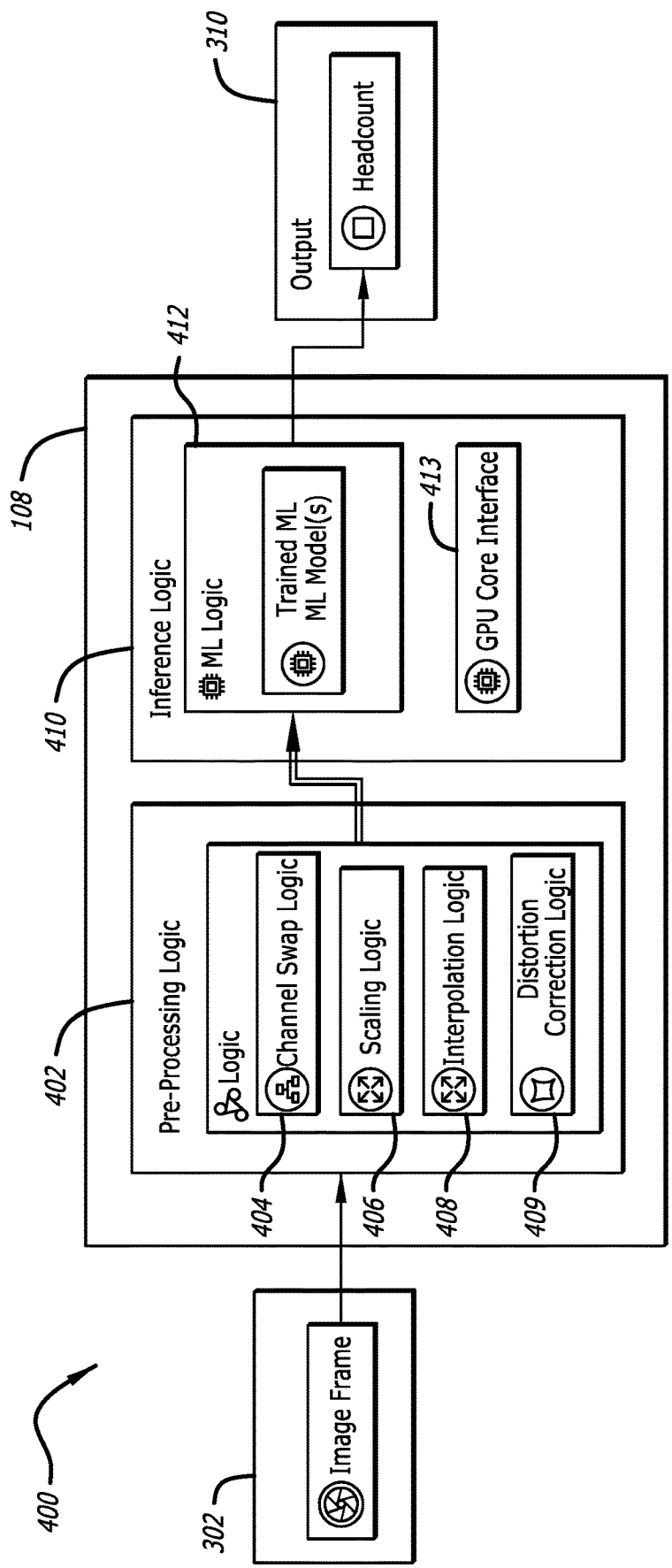
FIG. 4 is logical diagram illustrating logical components of the embodiment of FIG. 3 and utilized in determining a headcount of a multi-passenger vehicle in accordance with some embodiments.

Referring to FIG. 4 is logical diagram illustrating logical components of the embodiment of FIG. 3 and utilized in the determining a headcount of a multi-passenger vehicle is shown in accordance with some embodiments. As discussed above, the processing unit 108 receives the image frame 302 and may perform operations comprising a pre-processing phase, where such operations are performed by the pre-processing logic 402. As illustrated in the flow 400, the pre-processing logic 402 includes a channel swap logic 404, a scaling logic 406, an interpolation logic 408 and a distortion correction logic 409. The channel swap logic 404 performs operations resulting in reordering of the color channels of the received image frame 302 based on the requirements of the ML model 412. For instance, as one example referenced above, the channel swap logic 404 may reorder color channels from an initial ordering of blue-green-red (BGR) to a second ordering of red-green-blue (RGB).

The scaling logic 406 performs operations of the scaling methodology initially referenced and which will be discussed in detail below at least with respect to FIGS. 5A-6D. In particular, the scaling logic 406 performs the two stage process of scaling, which generally includes scaling the received image frame 302 by a scaling factor and dividing the scaled imaged frame into sub-frames, which are provided as input to the ML model for scoring. Further, the interpolation logic 408 performs the operations comprising the interpolation process to upscale or downscale an image frame or sub-frame. The distortion correction logic 409 may be utilized as an additional pre-processing step when image frames are received from certain cameras, such as the cameras $212_1$-$212_2$ having 180° fish-eye lens as discussed above.

Following the pre-processing phase, the inference logic 410 performs operations comprising a scoring phase, which includes scoring of each sub-frame generated by the pre-processing logic 402. The GPU core interface 413 enables the inference logic 410 to utilize the cores of the GPU 308 for the scoring by the ML model of the ML model logic 412. As noted above, following the scoring of each sub-frame, the ML model logic performs a threshold comparison between a predetermined threshold and the scoring result for each sub-frame, where satisfaction of the threshold comparison indicates that the sub-frame includes a single face. Thus, the output 310, which is the headcount determined to be included in the received image frame 302, is equal to the sum of the number of sub-frames that satisfy the threshold comparison.

Figure 5A:
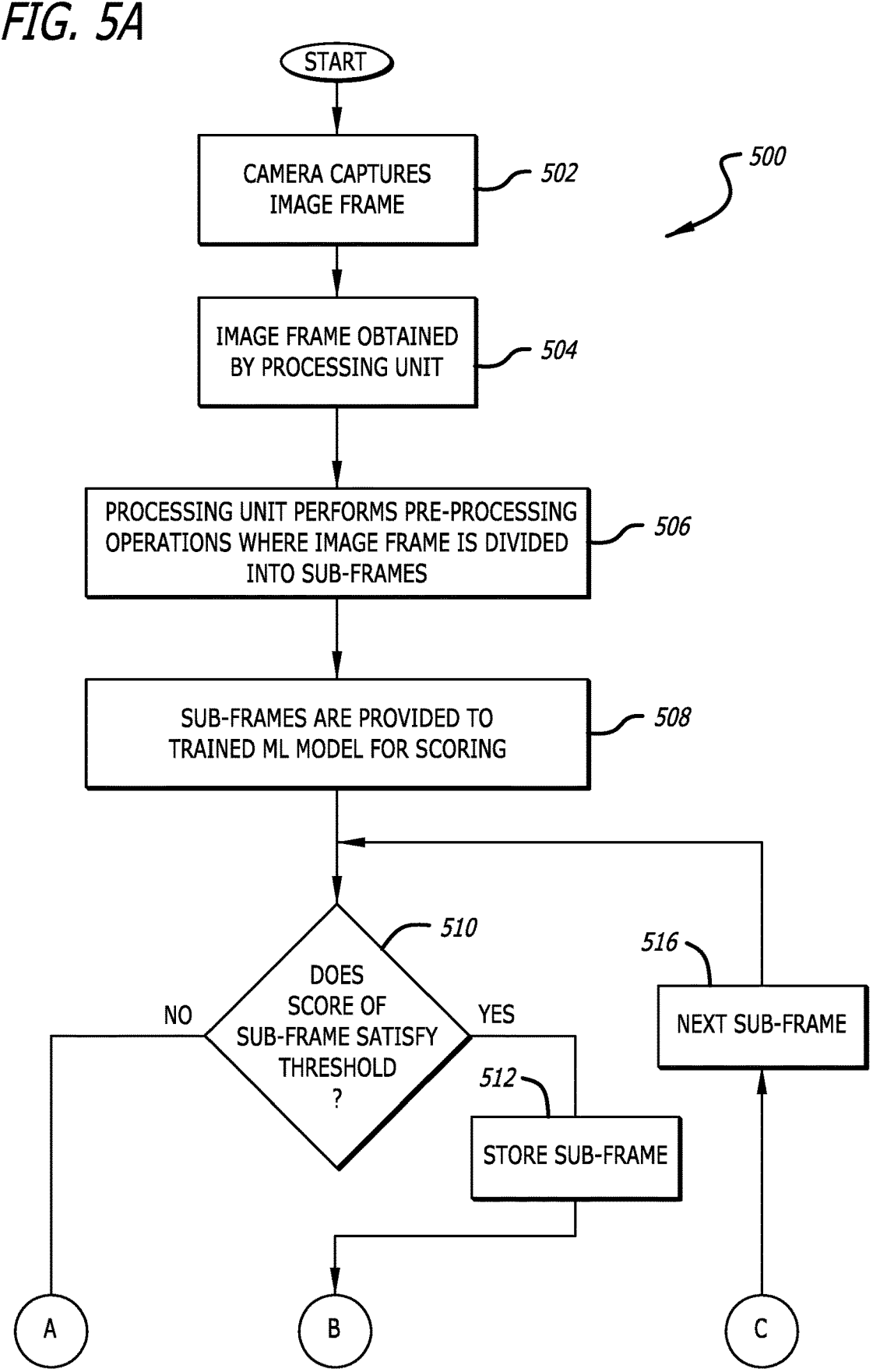
FIGS. 5A-5B illustrate a flowchart of an exemplary embodiment of determining a headcount by the logical components illustrated in FIG. 4 in accordance with some embodiments.
Figure 5B:
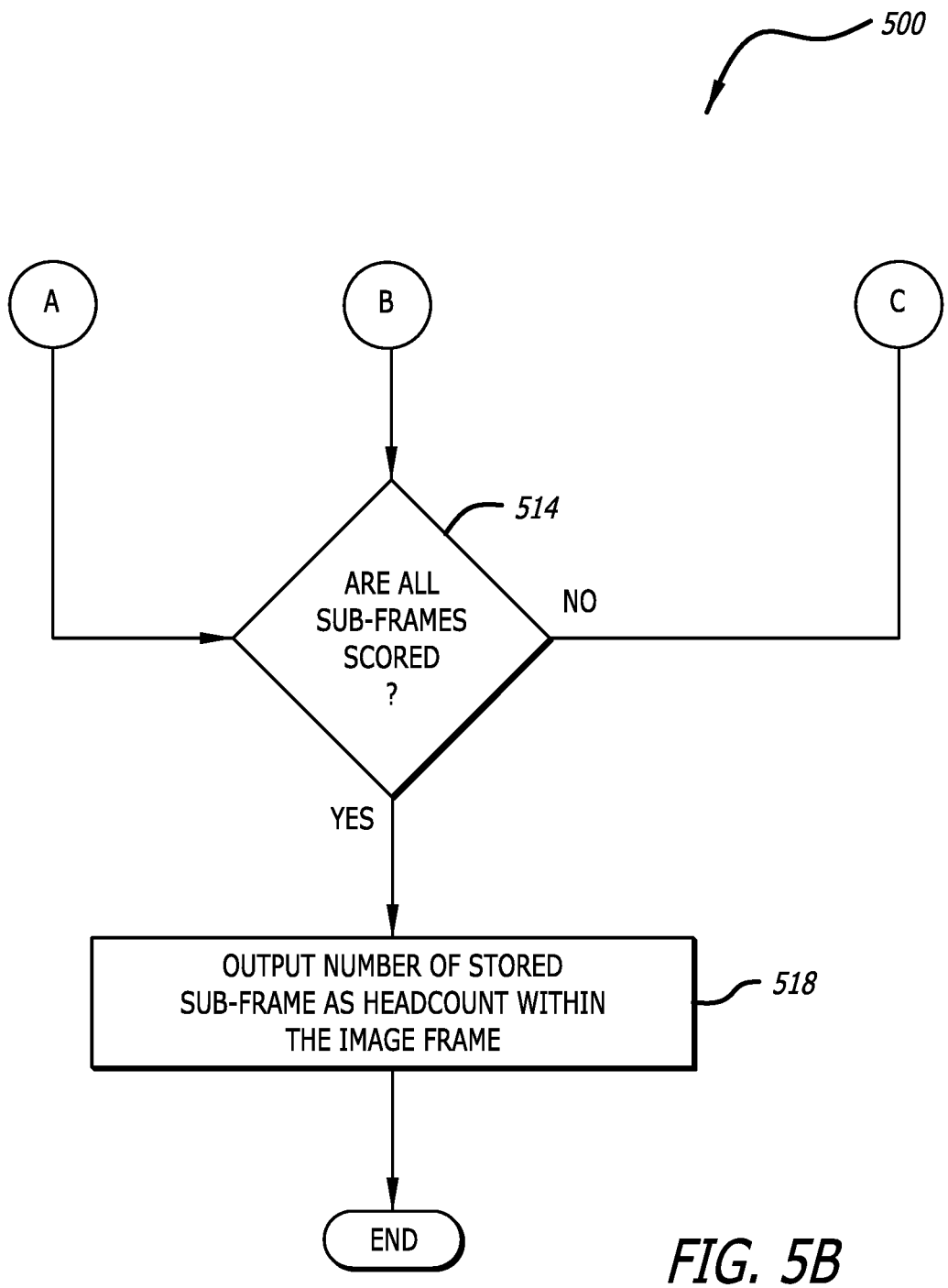

Referring to FIGS. 5A-5B, a flowchart illustrating an exemplary embodiment of determining a headcount by the logical components illustrated in FIG. 4 is shown in accordance with some embodiments. Each block illustrated in FIGS. 5A-5B represents an operation performed in the method 500 of determining a headcount within a received image frame performed by the facial recognition-based vehicle operations platform 100 of FIG. 1. It should be understood that not every operation illustrated in FIGS. 5A-5B is required. Referring to FIG. 5A, the method 500 begins when a camera captures an image frame (block 502). As noted above, a camera, such as the camera 104 of FIG. 2A may capture an image frame of an interior of a multi-passenger vehicle. Following capture of the image frame by the camera, the image frame is obtained by a processing unit, such as the processing unit 108 (block 504).

The processing unit performs an analysis on the image frame, which includes a pre-processing phase and a scoring phase. First, the processing unit performs the pre-processing phase, where operations include dividing the image frame into sub-frames (block 506). The sub-frames each have a size that is in accordance with the requirements of a ML model that will perform scoring on the sub-frame during the scoring phase.

Each sub-frame is then provided to a trained ML model for scoring (block 508). The resulting score for a sub-frame is then compared against a predetermined threshold (block 510). In some embodiments, each of the scores are stored in an array. Each score may be translated from a "raw score" to probability score, which may then be compared against the predetermined threshold.

When the score of a sub-frame satisfies the threshold comparison, the sub-frame is stored and the determination is made as to whether all sub-frames have been scored (blocks 512-514). In some embodiments, the stored sub-frame represents a bounding box of a detected face. In some particular embodiments, the sub-frame may be refined (e.g., expand or shrink the size of the sub-frame to include additional pixels or remove pixels, respectively). In such an instance, the refining is performed according to a heatmap, where logic compares the sub-frame with neighboring sub-frames (and their corresponding scores) to expand or shrink the sub-frame with respect to the direction of a neighboring sub-frame. In some embodiments, refinement of a sub-frame includes expanding or shrinking the sub-frame in order to better determine a bounding box of a detected face based on the scores of neighboring sub-frames. For example, and with respect to a "first sub-frame," the inference logic 410 may compare the score of the first sub-frame to neighboring sub-frames in either of direction on either of the X-axis and/or the Y-axis (of an X-Y coordinate plane). When the score of a neighboring sub-frame is greater than the score of the first sub-frame, the size of the first sub-frame will expand in the axial direction of that neighboring sub-frame. Conversely, when the score of a neighboring sub-frame is less than the score of the first sub-frame, the size of the first sub-frame will shrink in the axial direction of that neighboring sub-frame. The amount that the first sub-frame is adjusted may be a set amount in some embodiments. However, in other embodiments, the amount that the first sub-frame is adjusted may be a weighted amount based on the difference in the scores between the first sub-frame and the neighboring sub-frame, where a larger difference may cause a greater adjustment while smaller difference results in less of an adjustment. When the score of a sub-frame does not satisfy the threshold comparison, the determination is made as to whether all sub-frames have been scored (block 514).

Referring now to FIG. 5B, when all sub-frames have not been scored, the method 500 performs the threshold comparison utilizing a subsequent sub-frame (blocks 514-516 and 510). However, when all sub-frames have been scored, the method 500 outputs the number of stored sub-frames as the headcount included within the image frame (blocks 514 and 518).

Referring to FIGS. 6A-6D, illustrations of an exemplary embodiment of operations performed by the logical components illustrated in FIG. 4 when determining a headcount by the method of FIGS. 5A-5B are shown in accordance with some embodiments. Each of FIGS. 6A-6D illustration a progression in the method 500 of FIGS. 5A-5B, where any of FIGS. 6A-6D represent one or more operations performed by the processing unit 108 and one or more blocks of FIGS. 5A-5B.

Figure 6A:
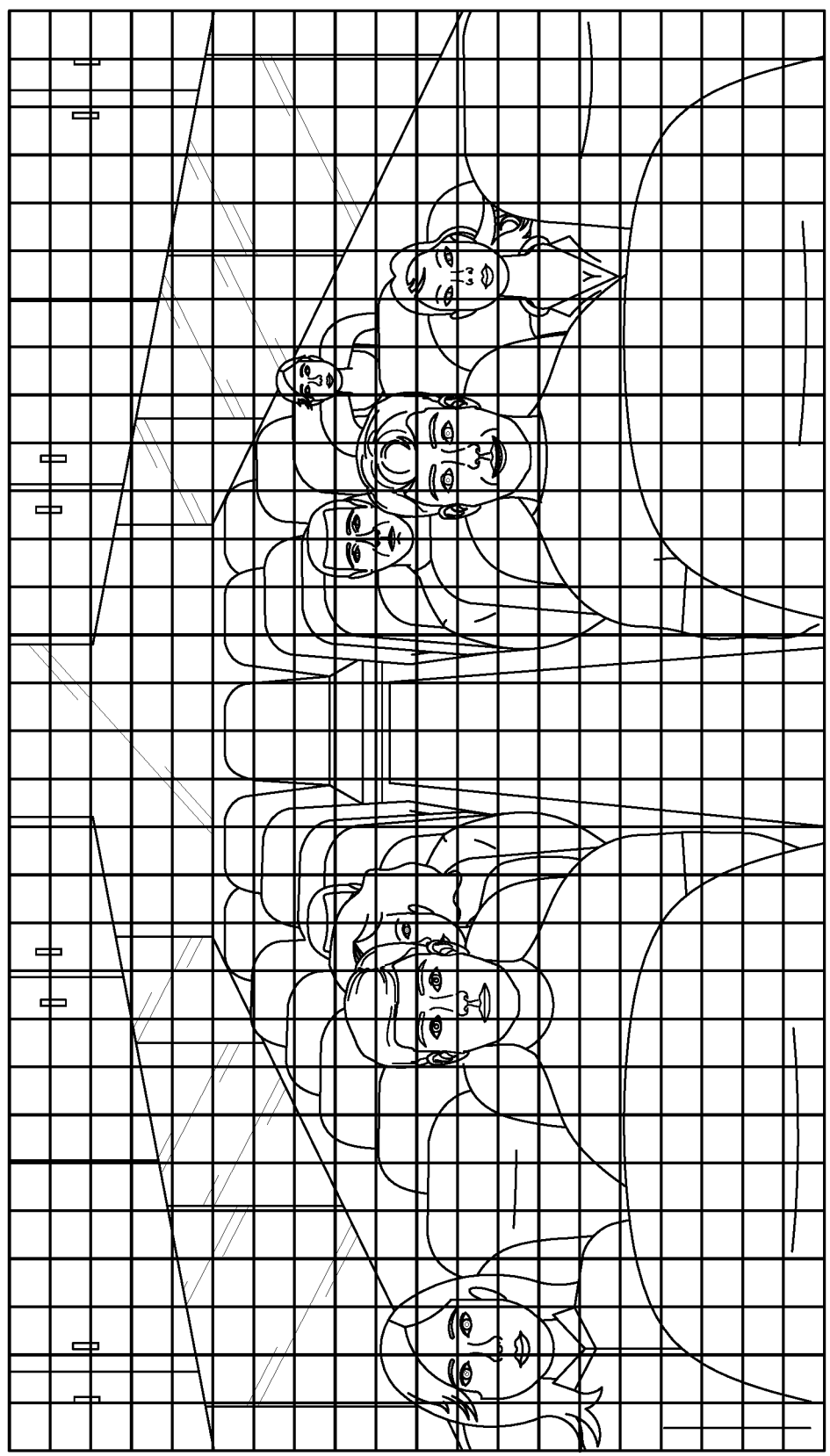
FIGS. 6A-6D illustrate an exemplary embodiment of operations performed by the logical components illustrated in FIG. 4 when determining a headcount by the method of FIGS. 5A-5B in accordance with some embodiments.
Figure 6B:
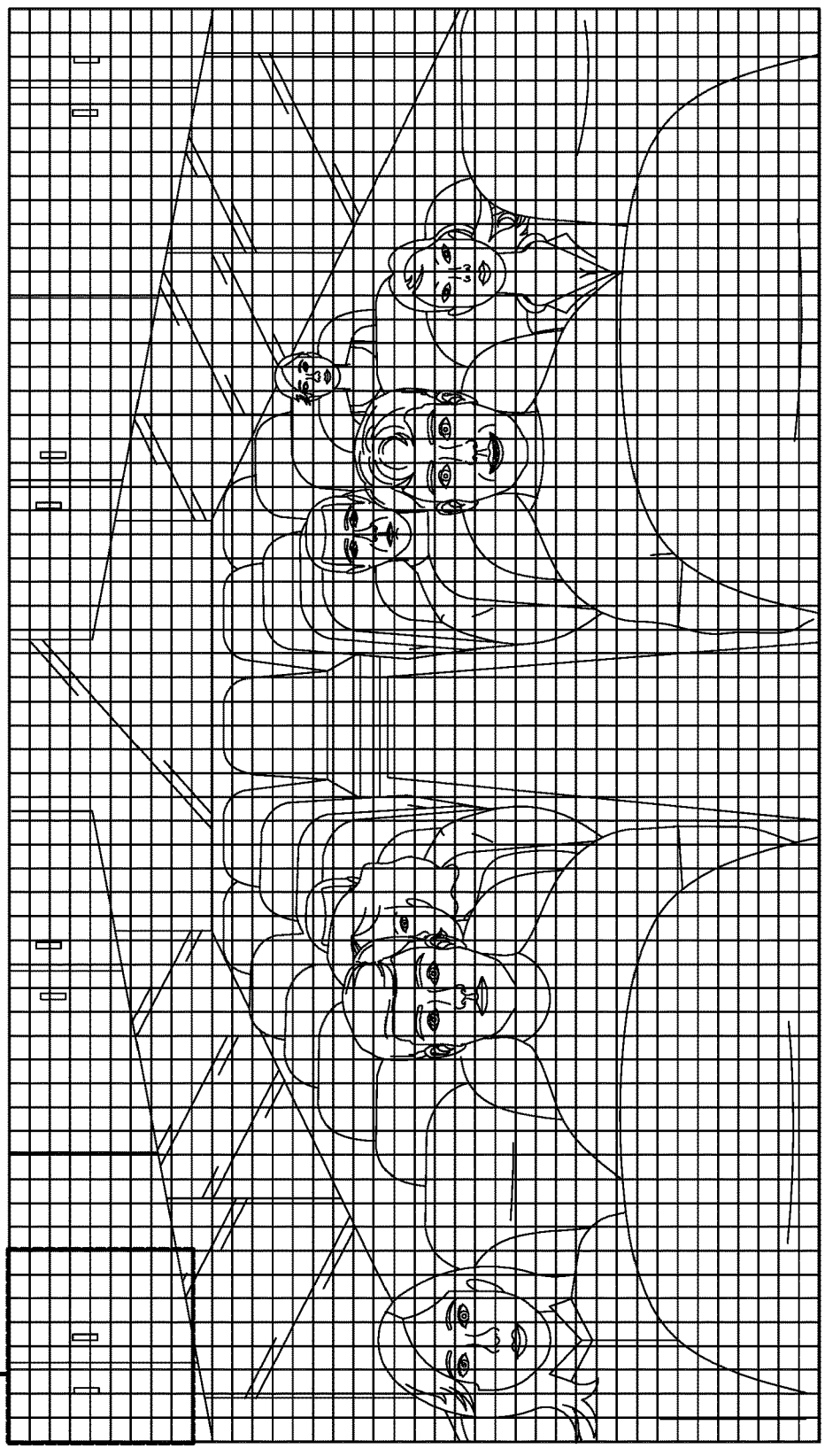
Figure 6C:
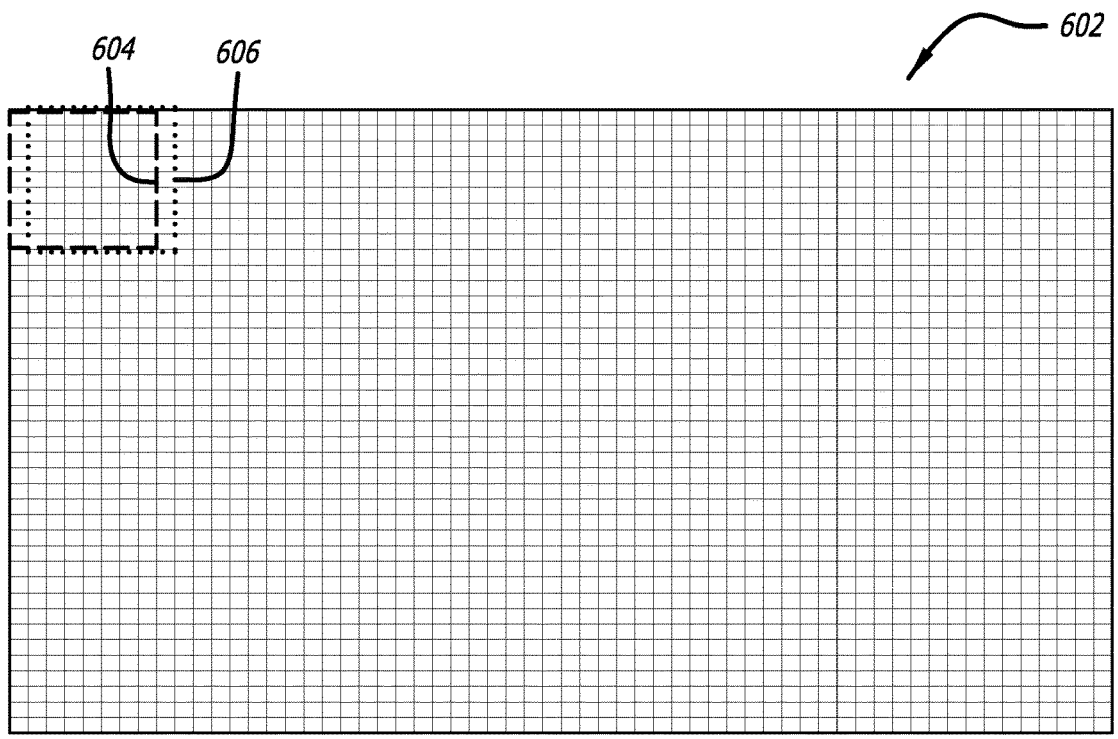

Referring now to FIG. 6A, an exemplary image frame 600 provided to the processing unit 108 by a camera 104 is shown. For example, the image frame 600 may have been captured by the camera 104 of FIG. 2A or the camera 104₁ of FIG. 2B. Further, FIG. 6A shows a sample set of pixels comprising the image frame 600 as the processing unit 108 receives the image frame 600. FIGS. 6B-6C illustrate the scaling methodology of the pre-processing phase performed by the pre-processing logic 402. Although the FIGS. 6A-6D do not specifically illustrate a color channel swapping process, such may be performed during the pre-processing phase.

The scaling methodology may comprise a two stage process. First, the image frame is scaled in accordance with the input required by the ML model. The first stage is illustrated in the scaling of image frame 600 in FIG. 6A resulting in the scaled image frame 602 of FIG. 6B. Second, the image frame may be divided into sub-frames in accordance with the input required by the ML model. The second stage is illustrated by the plurality of exemplary sub-frames 604-608 illustrated in FIGS. 6B-6D.

Figure 6D:
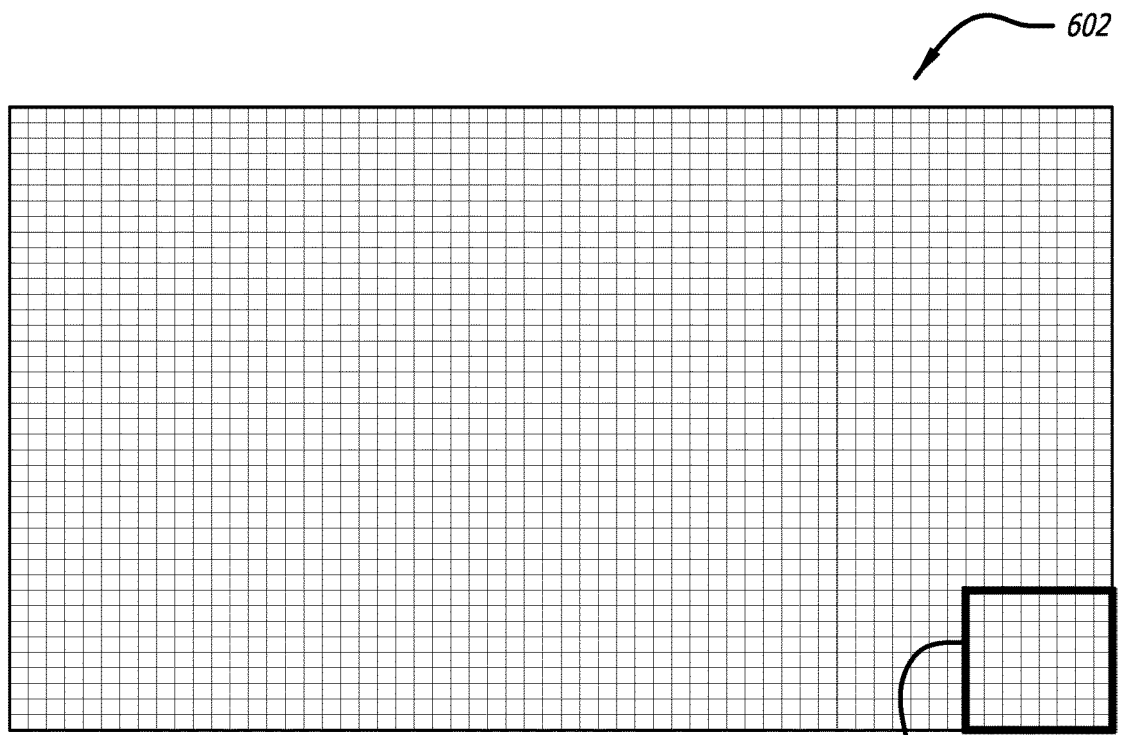

Referring specifically to FIG. 6B, the image frame 600 has been scaled by a factor of two (2) resulting in the scaled image frame 602, which has twice as many pixels as the image frame 600. Further, a first sub-frame 604 is shown starting at the coordinates (0,0), where the sub-frame 604 has a size of 8×9 pixels. Referring now to FIG. 6C, it is noted that the graphics of the image frame 602 have been removed for purposes of clarity of the disclosure and in order to adequately illustrate the multiple sub-frames 604-606. FIG. 6C illustrates the first sub-frame 604 and a second sub-frame 606, where sub-frame 606 starts at coordinates (1,0), has a size of 8×9 pixels and overlaps seven of the eight row columns of sub-frame 604 and all of the rows. Thus, in some embodiments, the division of the image frame 602 into sub-frames includes forming sub-frames by iteratively selecting a set of pixels (e.g., 8×9 in this example), where each subsequent sub-frame overlaps the contents of the previous sub-frame by all but one row or one column. The iterative process continues until all possible sub-frames have been generated. FIG. 6D illustrates the last step in the iterative process for the example of FIGS. 6A-6D, i.e., the generation of the sub-frame 608. As is noted above, each sub-frame is provided to the interference logic 410 for scoring by the ML model.

As is understood, the illustration of FIGS. 6A-6D provides merely one example and is not intended to be limiting as to the size of the received image frames or the sub-frames. For instance, a second example may include an image frame having dimensions of 3600×550, where application of a scale of 2.0 would result in a scaled image having dimensions of 7200×1100. Further, such an example may include dividing the scaled image into sub-frames having dimensions of 300×300. Such a process would result in 825,000 overlapping sub-frames.

Referring now to FIG. 7, a second exemplary embodiment of a facial recognition-based vehicle operations platform 700 is shown in accordance with some embodiments. The platform 700 includes many of the same components in the platform 100 as illustrated in FIG. 1 including at least the dispatch portal 118 including the dispatch portal platform 116 and a mobile application 122. Additionally, the vehicle 702 may be similar to the vehicle 102 and include one or more cameras 104 and a location sensor 106. The processing unit 704 may include a single processor, while in other embodiments, the processing unit 704 may include a plurality of processors. In some embodiments, the processing unit 704 may further include non-transitory, computer-readable medium (storage), or at least have access to such. The processing unit 704 may differ from the processing unit 704 with respect to its functionality and the logic stored thereon.

As discussed above, and illustrated in FIGS. 3-4, the processing unit 108 includes pre-processing logic 402 and inference logic 410 that, in combination, enable the processing unit 108 to receive or obtain an image frame, performing pre-processing operations and scoring by a machine-learning model, and providing an output indicating a headcount captured within the image frame. Differently, the processing unit 704 of FIG. 7 is not shown to include the pre-processing logic 402 or the inference logic 410 but instead includes an encoding logic 706, where the encoding logic 706 encodes an image frame received from a camera prior to transmission to the cloud services 112.

Additionally, the platform 700 includes the cloud platform 708 including the cloud services 710. The cloud services 710 may include the APIs & Services ("APIs") 112 and a facial detection logic & APIs ("facial detection logic") 712. The facial detection logic 712 may include both the pre-processing logic 402 and inference logic 410 and, upon execution of each utilizing the resources of the cloud platform 708, perform the operations described above. Stated differently, the facial detection logic 712 may operate using cloud resources to perform the same operations as those performed by the processing unit 108 on an encoded image frame received via a communication 709.

V. Dispatch Portal Platform

As noted above with respect to FIG. 1, the facial recognition-based vehicle operations platform 100 includes a dispatch portal 118, which may include logic comprising a dispatch portal platform 116. The logic comprising the dispatch portal platform 116 may, upon execution by a processor of a networking device, be configured to cause performance of operations including receiving data from the cloud services 112, rendering certain Graphical User Interfaces (GUIs) that are viewable by a dispatcher 120, and receiving user input in response thereto.

The GUIs may be generated by the logic based on the data received from the cloud services 112, where the received data may include information pertaining to the route of vehicles (route information) deploying certain aspects of the facial recognition-based vehicle operations platform 100, such as one or more cameras 104 or 212, a location sensor 106 and the processing unit 108. The information pertaining to the route of a vehicle may include real-time location information (e.g., from the location sensor), estimated time of arrival at each future stop along its route, traffic information along the route (e.g., sourced or retrieved from public data sources such as GOOGLE MAPS™), etc.

Additionally, the received data may include the headcount of passengers of such vehicles at various points along its route. The headcount of passengers within a vehicle may accompany the route information discussed above such that one or more GUIs may be generated and rendered that illustrate the route information as well as passenger capacity information. In some embodiments, the captured image frames may also be obtained by the dispatch portal platform 116 for display.

Further, the logic comprising the dispatch portal platform 116 may receive information from the cloud services 112 pertaining to a reservation system, and specifically, a reservation status for each seat on vehicles deployed the certain aspects of the facial recognition-based vehicle operations platform 100. Examples of such reservation information may include, but is not limited or restricted to, currently reserved and occupied, reserved for future occupation at future stop, currently reserved and occupied until future stop, etc.).

Additionally, the comprising the dispatch portal platform 116 be configured to receive user input corresponding to selection of an option to automatically generate a report detailing various passenger and telemetry data for a dispatcher or other administrator. For instance, a graphical user interface (GUI) screen may be accessible and viewable by the dispatcher that includes a header having selectable tabs of, inter alia: Dispatch, Assets, Drivers, Routes, Reports and Feedback (see FIG. 8B). In some embodiments, selecting the "Dispatch" tab results in the graphical display of a map and various vehicle routes (see FIGS. 8A-8B). Selection of the "Assets" tab results in a display of a table listing a mapping of devices (cameras, location sensors, processing units, etc.) and a current vehicle in which the device is installed or deployed. Similarly, selection of the "Drivers" tab results in a display of a table listing a mapping of drivers and a current vehicle in which the driver is assigned. Further, selection of the "Routes" tab results in a display of a table listing route information and mapping a route to a method of display on the graphical display of the map (e.g., the color by which a particular route is represented).

Selection of the "Reports" tab results in a display of a plurality of user input fields (e.g., drop down selection menus, radio dials, text boxes, etc.) that are each configured to receive user input pertaining to a field within a report to be generated. For example, a "Report Type" may be selected, such as "Headway" (detailing the average time a person waits at a particular stop), "Runtime" (detailing the average time a vehicle takes to complete a route), or "Ridership" (detailing the average number of passengers on a particular vehicle, or total number of passengers during a particular time frame), etc. As implied, additional user input may be received pertaining to a particular time frame, a particular route, a particular vehicle, a particular driver, etc.

Finally, selection of the "Feedback" tab results in a display of a table listing all feedback received (which may be provided via the mobile application 122), where the feedback information displayed may include a timestamp of when the feedback was received, a category (e.g., positive, negative, neutral, help, which may be selected by the passenger/potential passenger from a predetermined grouping), any details the passenger provided (e.g., free-form text or preformed selectable comments) and passenger information.

Figure 8A:
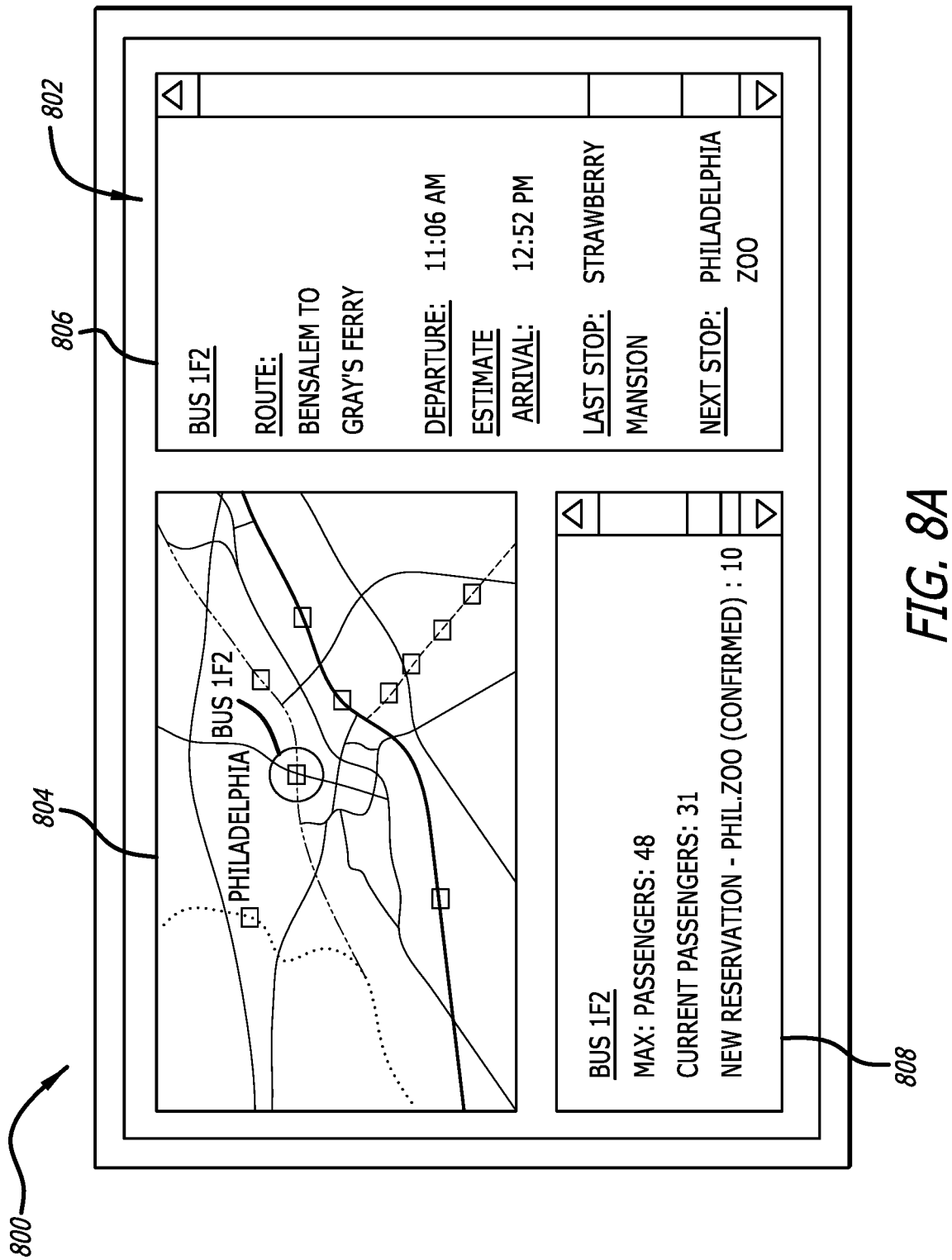
FIG. 8A is a first exemplary graphical user interface (GUI) display screen rendered on a network device of a dispatcher in accordance with some embodiments.

Referring now to FIG. 8A, an exemplary graphical user interface (GUI) display screen rendered on a network device of a dispatcher is shown in accordance with some embodiments. FIG. 8A illustrates a GUI 802 rendered on a display screen 800 of a network device, e.g., the dispatch portal 118. The GUI 802 is shown to include a plurality of display windows 804-808. In the embodiment shown, the display window 804 includes a graphical illustration of a map of a geographic area that includes a plurality of vehicle routes, including the route of an exemplary vehicle referred to as "BUS 1F2." The display window 804 may provide visual indications of the vehicle routes that are distinct from the map, e.g., colored route lines, bolded route lines, etc. Further, an icon representing each vehicle deploying the certain aspects of the facial recognition-based vehicle operations platform 100 may be displayed at its current geographic location such that the content of the display window 804 may be continuously updated as the dispatch portal platform 116 receives route information from the cloud services 112. In some embodiments, the content of the display window 804 is updated in substantially real-time (where "substantially real-time" may refer to a time period within a predetermined threshold of real-time, such as within a predetermined number of seconds of real-time, such as within 5 seconds of real-time).

Additionally, the GUI 802 includes the display window 806 that is rendered to provide a first set of status information regarding a selected vehicle, e.g., the BUS 1F2. In some embodiments, the first set of status information may pertain to route information such as the route of the selected vehicle, the departure time, the estimated arrival time, the last (most recent) stop, the next stop, etc.

Further, the GUI 802 includes the display window 808 that is rendered to provide a second set of status information regarding the selected vehicle (here, BUS 1F2). For example, the display window 808 may provide information such as a maximum number of passengers for the vehicle, the current number of passengers (based on the headcount information received from the cloud services 112) and new confirmed reservations at a particular stop (e.g., the next stop).

Thus, the dispatch portal platform 116 comprises logic that, upon execution, is configured to receive various information and data from the cloud services 112, and generate and render GUIs that graphically illustrate such for a dispatcher 120. Additionally, such logic combines data received pertaining to multiple vehicles and transforms such data into graphical illustrations that allow the dispatcher 120 to visually comprehend the combined data. Further, by receiving user input (e.g., selection of a particular vehicle), the dispatch portal platform 116 may cause the rendering of various display windows providing detailed information (often in real-time) about the selected vehicle to the dispatcher 120.

Figure 8B:
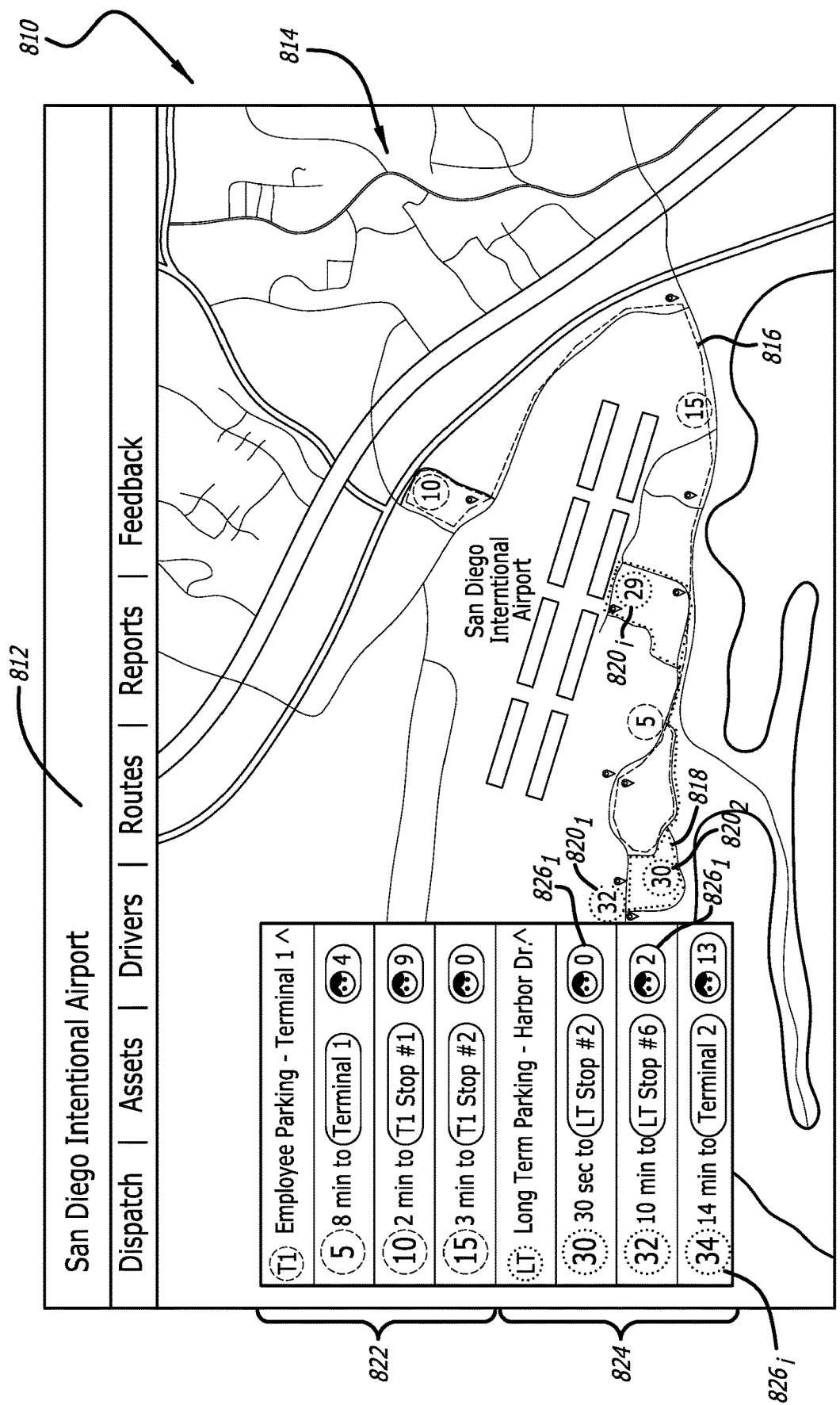
FIG. 8B is a second exemplary graphical user interface (GUI) display screen rendered on a network device of a dispatcher in accordance with some embodiments.

Referring now to FIG. 8B, a second exemplary graphical user interface (GUI) display screen rendered on a network device of a dispatcher is shown in accordance with some embodiments. The GUI 810 illustrates a map 814 of a geographic region and a header 812 that may state the geographic location shown on the map 814. The map 814 includes an illustration of a plurality of vehicle routes, e.g., routes 816 and 818. The routes may be displayed in a visually distinct manner from each other (e.g., different colors, different line thickness, etc.). Each route illustrates the location of each vehicle assigned to that route and a vehicle identifier. For example, the route 818 includes three vehicles currently assigned thereto: vehicle 820$_1$ (having a vehicle identifier (ID) of "32"), vehicle 820$_2$ (having a vehicle identifier (ID) of 30) and vehicle 820$_i$ (having a vehicle identifier (ID) of 34). Of course, there may be a greater or fewer number of vehicles assigned to a route.

The GUI 810 also includes a graphical display portion comprising one or more sections, such as the sections 822-824, where each section 822-824 displays data pertaining to one of the routes 816-818. For example, as shown, the section 822 pertains to the route 816 and the section 824 pertains to the route 818. In some embodiments, the sections may be displayed as a table having a plurality of rows, where each row represents a vehicle currently assigned to that route. For example, the section 824 may be displayed as a table where a first row provides a route name ("LT—Long Term Parking—Harbor Drive") and each of the three subsequent rows 826$_1$-826$_3$ corresponds to a vehicle assigned to the route (route 818). Using the row 826$_1$ as an example, the row may display information including a vehicle identifier ("30"), a number of minutes and/or seconds until arrival at a particular stop on the route ("30 sec to LT Stop #2"), and a number of empty seats ("0").

IV. Mobile Application Reservation System

Figure 9:
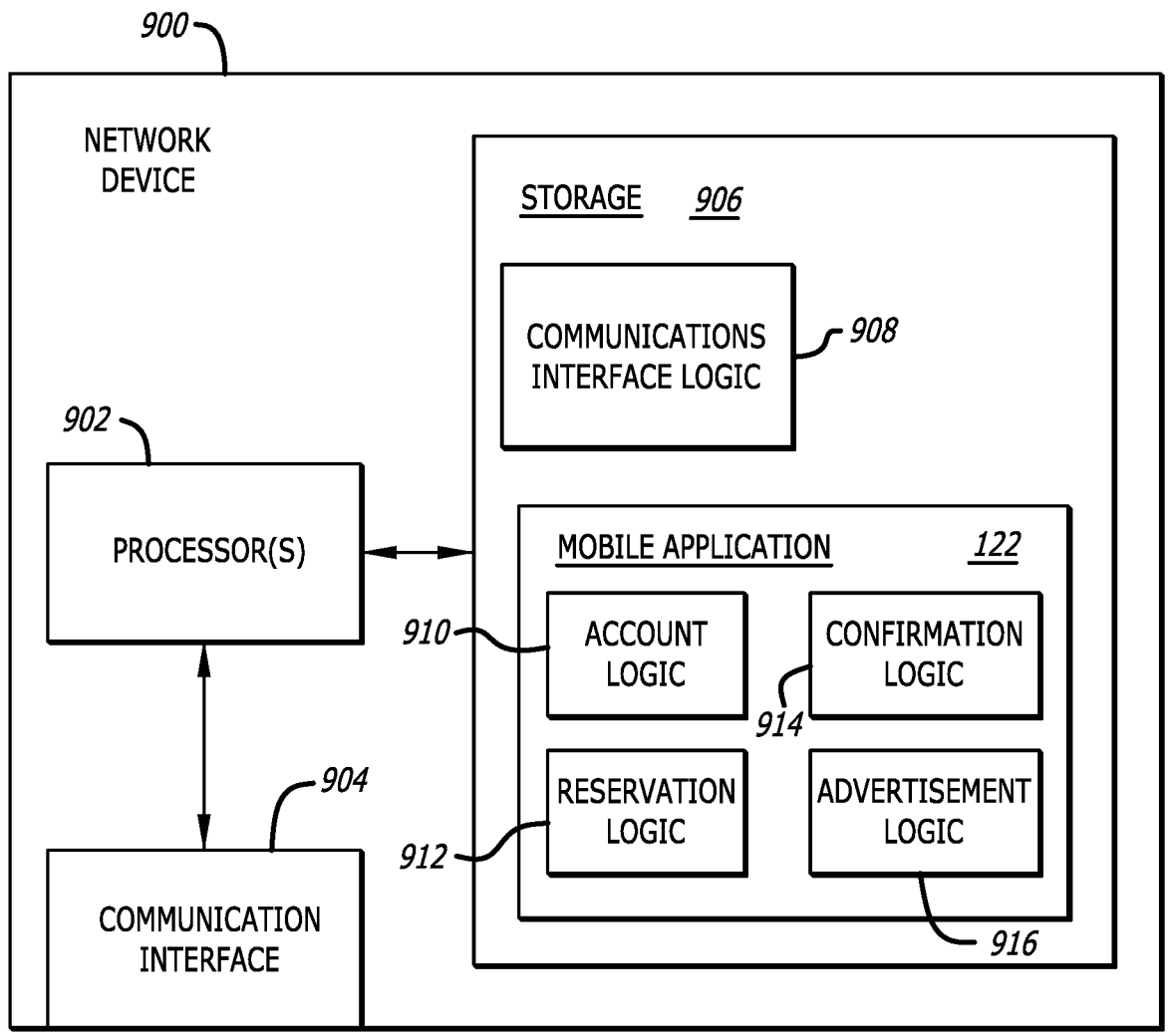
FIG. 9 is a logical diagram illustrating logical components comprising a mobile application operating on a network device in accordance with some embodiments.

Referring to FIG. 9, logical diagram illustrating logical components comprising a mobile application operating on a network device is shown in accordance with some embodiments. The network device 900, in one embodiment, may include a housing, which may be made entirely or partially of a hardened material (e.g., hardened plastic, metal, glass, composite or any combination thereof) that protects the circuitry within the housing, namely one or more processors 902 that are coupled to a communication interface 904 via a first transmission medium. The communication interface 904, in combination with a communication logic 908, enables communications with external network devices to receive communications (e.g., send/receive information pertaining to or facilitating a reservation). According to one embodiment of the disclosure, the communication interface 904 may be implemented as a physical interface including one or more ports for wired connectors. Additionally, or in the alternative, the communication interface 904 may be implemented with one or more radio units for supporting wireless communications with other electronic devices. The communication interface logic 908 may include logic for performing operations of receiving and transmitting one or more objects via the communication interface 904 to enable communication between the mobile application 122 and network devices via a network (e.g., the internet) and/or cloud computing services, not shown.

The processor(s) 902 is further coupled to a persistent storage 906 (e.g., non-transitory, computer-readable medium) via a second transmission medium. According to one embodiment of the disclosure, the persistent storage 906 may have stored thereon the mobile application 122, which may include the following logic modules: an account logic 910, a reservation logic 912, a confirmation logic 914 and an advertisement logic 916. The operations of these software modules, upon execution by the processor(s) 902, are described throughout the disclosure. Of course, it is contemplated that some or all of this logic may be implemented as hardware, and if so, such logic could be implemented separately from each other.

With respect to the reservation logic 912, the logic, upon execution by a processor, may be configured to exchange communications with the cloud services 112. In particular, the reservation logic 912 may be configured to receive information such as route information for one or more vehicles as discussed herein as well as seating information particular to specific vehicles. For instance, received route information may be utilized by the reservation logic 912 to generate and cause the rendering of GUIs that display the location of one or more vehicles, estimated time of arrival to the vehicle's next stop (and/or all future stops), and, optionally, traffic information corresponding to particular vehicle routes. Additionally, received seating information may be available for all (or a subset) of the vehicles that deploy certain aspects of the facial recognition-based vehicle operations platform 100, where, for a particular vehicle, the seating information may include a maximum capacity, current capacity and/or currently reserved seats for a future stop. In some embodiments, the current capacity for a particular vehicle is determined by the processing unit 108 of that particular vehicle, as discussed above. As noted above, the mobile application 122 may receive real-time updates (or substantially real-time), which enables the reservation logic 912 to provide real-time information to a user.

In some embodiments, the GUIs may be configured to receive user input corresponding to selection of a specific seat within a particular vehicle, i.e., a reservation request for a specific seat. In other embodiments, the GUIs may be configured to receive user input corresponding to a general reservation for a particular vehicle, i.e., a reservation request generally for an unspecified seat on the vehicle.

In some embodiments, the ML logic 412 of the processing unit 108 may include a ML model (which may be the same as the ML model discussed above or may be an additional ML model) that scores frames or sub-frames for open seats. The score of the frame, sub-frame, or cluster of sub-frames may then be compared to a threshold and when the threshold comparison is satisfied, an open seat may be detected. Once an open seat is detected with a frame, sub-frame or cluster, the positioning of the open seat within the vehicle may be determined such that a particular seat number (or identifier) may be determined. For example, a sub-frame or cluster may represent a particular known portion of a captured image frame, which corresponds to a location within the vehicle. The location within the vehicle is also known to correspond to a particular seat. Therefore, upon detection of an open seat within the vehicle, the interference logic 410 may determine which particular seat corresponds to the detected open seat and an associated or assigned seat identifier. Upon completion of analyzing the captured image frame, a headcount may be determined as well as a list of seat identifiers corresponding to open seats. The list of seat identifiers may be provided to the cloud services 112, which provides such to the reservation logic 912. The reservation logic 912 may then allow a potential passenger to reserve an open seat. A listing of reserved open seats may be maintained by the cloud services 112 such that once an open seat is reserved, the seat cannot be reserved by additional potential passengers.

Figure 10:
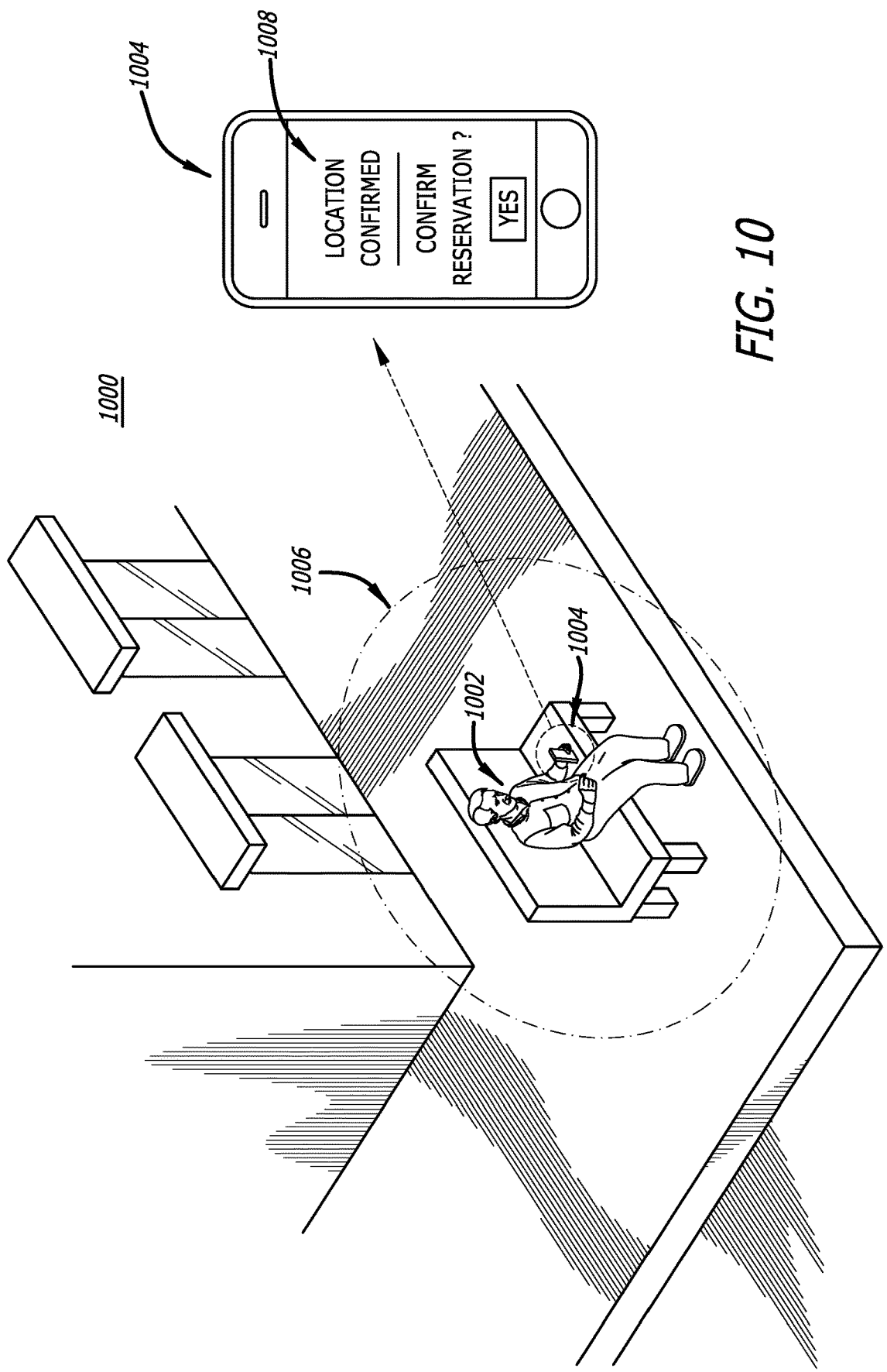
FIG. 10 is an exemplary illustration of confirmation of a reservation for a multi-passenger vehicle utilizing geo-fencing in accordance with some embodiments.

Referring to FIG. 10, an exemplary illustration of confirmation of a reservation for a multi-passenger vehicle utilizing geo-fencing is shown in accordance with some embodiments. In some embodiments, the confirmation logic 914 of the mobile application 122 may be configured to require confirmation of a potential passenger's location (e.g., within a predetermined distance of stop on a route of a particular vehicle) in order to confirm the reservation. FIG. 10 illustrates such an embodiment in which a potential passenger 1002 that has previously reserved a seat on a vehicle has come within a predetermined distance to a stop, where the predetermined distance is indicated by the geo-fenced area 1006. Thus, upon entering the geo-fenced area 1006, the mobile application 122 operating on the mobile device 1004 may generate and render the display screen 1008, which indicates to the potential passenger 1002 that he (or she) has entered the geo-fenced area 1006 and is now permitted to confirm his/her reservation through input to the display screen 1008. The user input confirming the reservation may then be provided to the cloud services 112 such that the reservation is finalized. In some embodiments, user input is not required to confirm reservation; instead, merely entering the geo-fenced area 1006 with the mobile application 122 processing on a mobile device automatically confirms the reservation.

In some embodiments, if a reservation is not confirmed within a predetermined time prior to the vehicle's estimated arrival at the stop, the cloud services 112 may release the reservation and open the seat for reservation by others.

Figure 11:
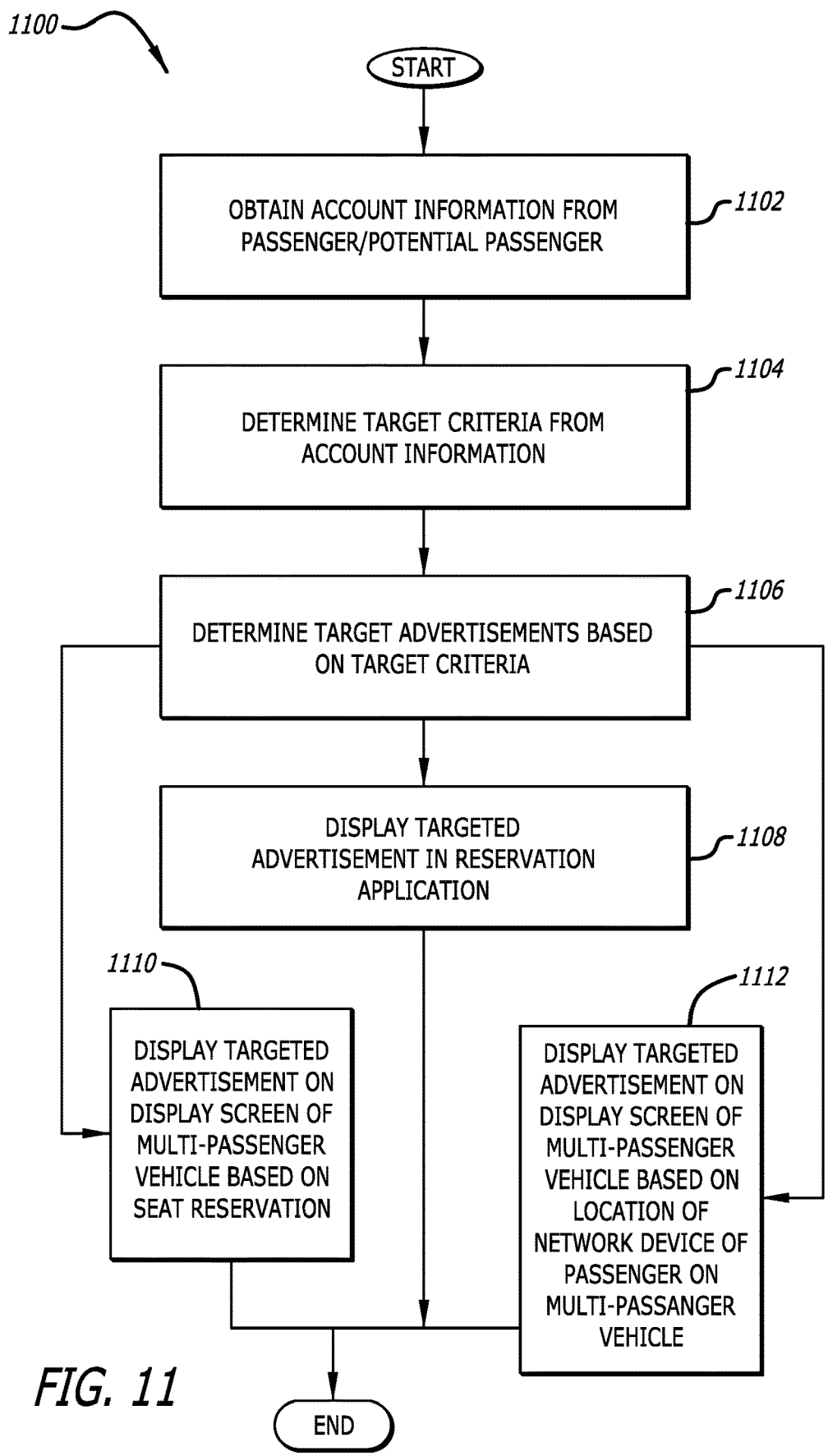
FIG. 11 is a flowchart illustrating a method of providing target advertisements to passengers or potential passengers of a multi-passenger vehicle in accordance with some embodiments.

Referring to FIG. 11, a flowchart illustrating a method of providing target advertisements to passengers or potential passengers of a multi-passenger vehicle is shown in accordance with some embodiments. Each block illustrated in FIG. 11 represents an operation performed in the method 1100 of providing target advertisements to passengers or potential passengers performed by the facial recognition-based vehicle operations platform 100 of FIG. 1. It should be understood that not every operation illustrated in FIG. 1 is required. At least some of the operations of the method 1100 may be performed by the advertisement logic 916, i.e., those performed by a network device of a user.

The method 1100 begins when account information is obtained from a passenger or potential passenger (block 1102). In some instances, the account information may include one or more of the following, but is not limited hereto, name, gender, ethnicity, birthday, age (or range), occupation, billing or residential address, whether the passenger or potential passenger has children, interests of the passenger or potential passenger, network browsing cookies, etc. In some instances, the account information is provided as user input by the passenger or potential passenger. For example, the passenger or potential passenger may offer certain information at or following the time at which the account was created, e.g., name, gender, ethnicity, birthday, age (or range), occupation, billing or residential address, whether the passenger or potential passenger has children, interests of the passenger or potential passenger, etc. In some instances, the passenger or potential passenger may fill out one or more surveys from which certain information is collected, e.g., his or her interests. In other instances, certain information may be collected through the utilization of the network device by the mobile application (e.g., network browsing cookies). In some instances, the account logic 910 of FIG. 9 may be configured to retrieve (and store) the account information.

The method 1100 continues by determining advertisement target criteria from the account information (block 1104). The advertisement target criteria may include any of account information where such information may be utilized to determine targeted advertisements (block 1106). The targeted advertisements may be provided to the passenger or potential passenger in a variety of methods (blocks 1108-1112). In one instance, a targeted advertisement may be provided to a passenger or potential passenger via the mobile application 122 (block 1108). For example, prior to or following a reservation attempt, the targeted advertisement may be displayed by the mobile application 122 either as part of the display window or as a pop-up window. The targeted advertisement may be any media type (static image, video, audio or any combination).

In some embodiments, the mobile application 122 may be configured such that a potential passenger is provided the ability following the completion of the display of a targeted advertisement within a GUI of the mobile application 122. In other embodiments, a reservation request may be received via user input (e.g., selection of a particular seat via a GUI illustrating a vehicle) and, following receipt but prior to confirmation of acceptance, a targeted advertisement may be displayed within a GUI of the mobile application 122.

In some instances, the account information may indicate whether the passenger or potential passenger has a paid subscription to the mobile application 122, where a paid subscription may indicate a particular set or type of targeted advertisements (e.g., only static images, shorter audio or video advertisements compared to those provided to non-paid subscribers, etc.) or a paid subscription may indicate that no advertisements are to be shown.

Still referring to FIG. 11, a targeted advertisement may be displayed to a passenger on a display screen of a vehicle based on the seat reservation (block 1110). For instance, when a reservation request is received and confirmed by the cloud services 112, a recording of a portion of the account information (such as a name of the potential passenger or a unique identifier) may be stored along with the reserved seat of a particular vehicle and the stop at which the potential passenger is to board. Thus, the cloud services 112 may transmit targeted advertisement information to the vehicle for display on a particular display screen of the vehicle. For instance, a display may be embedded into the back of each seat, such that the targeted advertisement is displayed to a passenger facing the embedded display. In some embodiments, logic to receive the targeted advertisement information may be included within or accessible to the processing unit 108. In other embodiments, vehicles deploying aspects of the facial recognition-based vehicle operations platform 100 may include an additional processing unit (not shown) that may include persistent storage (or have access to such) that is configured to transmit the targeted advertisement to a particular seat based on the reservation system.

Additionally, a targeted advertisement may be displayed to a passenger on a display screen of a vehicle based on the location of the passenger within the vehicle (block 1112). For example, in instances where a reservation was not made but the passenger boarded and sat in a seat, the facial recognition-based vehicle operations platform 100 may still provide a targeted advertisement to the passenger via an embedded display of the vehicle. For instance, a vehicle may include one or more wireless transceivers, e.g., utilizing BLUETOOTH® technology, such that information is exchanged, e.g., beacons, between a wireless transceiver and a passenger's network device such that the transceiver (or accompanying logic) may determine the account associated with the passenger and the network device (e.g., through information included in the beacon by the mobile application 122). The transceiver may determine a location of the network device within the vehicle based on the signal strength of the transmission (beacon) received by the network device, and may further determine a seat location of the passenger based on the determined location of the network device.

Figure 12:
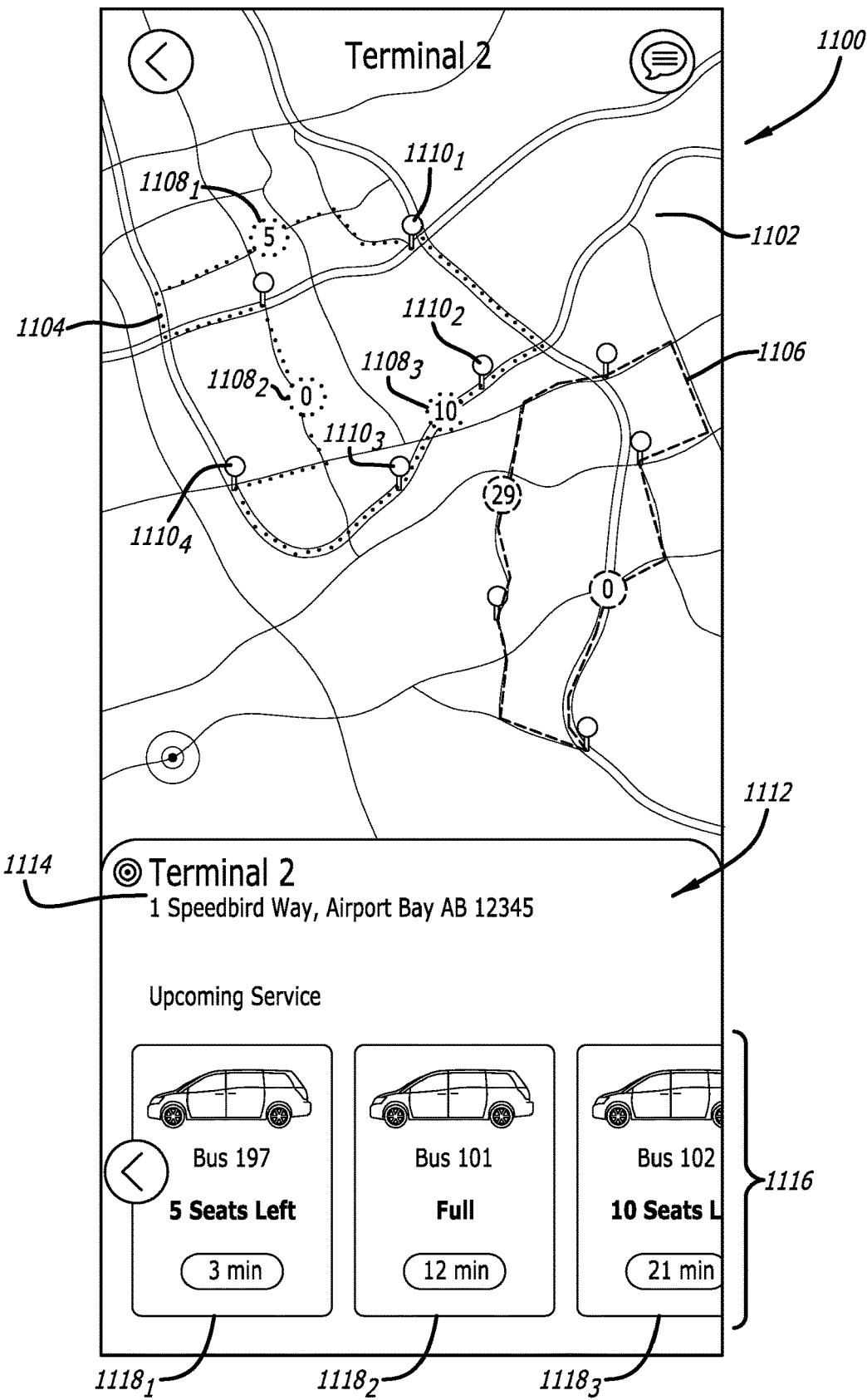
FIG. 12 is an exemplary graphical user interface (GUI) display screen rendered on a network device of a potential passenger in accordance with some embodiments.

Referring now to FIG. 12, an exemplary graphical user interface (GUI) display screen rendered on a network device of a potential passenger is shown in accordance with some embodiments. The GUI 1200 illustrates a map 1202 of a geographic region, where text indicating the geographic location may be shown on the map 1202 ("Terminal 2"). The map 1202 includes an illustration of a plurality of vehicle routes, e.g., routes 1204 and 1206. The routes may be displayed in a visually distinct manner from each other (e.g., different colors, different line thickness, etc.). Each route illustrates the location of each vehicle assigned to that route and a vehicle identifier. For example, the route 1204 includes three vehicles currently assigned thereto and an indicator of a number of empty seats: vehicle $1208_1$ (having "5" empty seats), vehicle $1208_2$ (having "0" empty seats) and vehicle $1208_3$ (having "10" empty seats). Each route also includes indicators (e.g., "pins" in this example) corresponding to each stop along the route. For example, the route 1204 includes a plurality of stops $1210_1$-$1210_4$. Of course, there may be a greater or fewer number of vehicles assigned to a route and/or stops along the route.

The GUI 1200 also includes a location infographic 1212 comprising a header 1114 that also indicates the geographic location displayed by the map 1202 and a series of upcoming service infographics $1218_1$-$1218_3$ that provide information as to each vehicle along a particular route. For example, the displayed upcoming service infographics $1218_1$-$1218_3$ pertain to the route 1104 and illustrate that a vehicle having the identifier "Bus 197" will arrive in three minutes and has five empty seats.

In the foregoing description, the invention is described with reference to specific exemplary embodiments thereof. However, it will be evident that various modifications and changes may be made thereto without departing from the broader spirit and scope of the invention.

What is claimed is:

1. A headcount determination system comprising:
a first camera; and
a processing unit configured to receive data communications that include an image frame captured by the first camera, the processing unit configured to access logic that, when executed, causes performance of operations including:
a pre-processing phase including performing a color channel swap process by reordering color channels of the image frame from a first ordering to a second ordering and dividing the image frame into sub-frames,
an inference phase including deploying a machine learning (ML) model on the sub-frames resulting in a scoring of each sub-frame, performing a threshold comparison with a score of each sub-frame and a threshold, and incrementing a headcount when the score satisfies the threshold comparison, and
when the threshold comparison has been performed scoring each sub-frame, providing the headcount as output.

2. The headcount determination system of claim 1, wherein the pre-processing phase further includes performing a scaling operation on the image frame that adjusts a size of the image frame by a scaling factor, wherein the scaling factor is based on input requirements of the ML model.

3. The headcount determination system of claim 1, wherein the size of each sub-frame is based on input requirements of the ML model.

4. The headcount determination system of claim 1, wherein the second ordering is based on input requirements of the ML model.

5. The headcount determination system of claim 1, wherein the pre-processing phase further including an interpolation operation to upscale or downscale the image frame.

6. The headcount determination system of claim 1, wherein the output is provided to cloud computing logic that operates on cloud computing services.

7. A headcount determination method comprising:
receiving an image frame captured by a first camera;
when a color channel ordering of the image frame is not consistent with a requirement of a machine learning (ML) model, performing a color channel swap process by reordering color channels of the image frame from a first ordering to a second ordering;
dividing the image frame into sub-frames;
deploying the ML model on the sub-frames resulting in a scoring of each sub-frame;
performing a threshold comparison with a score for each sub-frame and a threshold;
incrementing a headcount when the score satisfies the threshold comparison; and
when the threshold comparison has been performed for the score for each sub-frame, providing the headcount as output.

8. The method of claim 7, further comprising:
performing a scaling operation on the image frame that adjusts a size of the image frame by a scaling factor, wherein the scaling factor is based on input requirements of the ML model.

9. The method of claim 7, wherein a size of each sub-frame is based on input requirements of the ML model.

10. The method of claim 7, wherein the second ordering is based on input requirements of the ML model.

11. The method of claim 7, further comprising:
performing an interpolation operation to upscale or downscale the image frame.

12. The method of claim 7, wherein the output is provided to cloud computing logic that operates on cloud computing services.

13. A non-transitory computer readable storage medium having stored thereon instructions, the instructions being executable by one or more processors to perform operations comprising:
receiving an image frame captured by a first camera;
when a color channel ordering of the image frame is not consistent with a requirement of a machine learning (ML) model, performing a color channel swap process by reordering color channels of the image frame from a first ordering to a second ordering;
dividing the image frame into sub-frames;
deploying the ML model on the sub-frames resulting in a scoring of each sub-frame;
performing a threshold comparison with a score for each sub-frame and a threshold;
incrementing a headcount when the score satisfies the threshold comparison; and
when the threshold comparison has been performed for the score for each sub-frame, providing the headcount as output.

14. The non-transitory computer readable storage medium of claim 13, wherein the operations further include performing a scaling operation on the image frame that adjusts a size of the image frame by a scaling factor, wherein the scaling factor is based on input requirements of the ML model.

15. The non-transitory computer readable storage medium of claim 13, wherein the size of each sub-frame is based on input requirements of the ML model.

16. The non-transitory computer readable storage medium of claim 13, wherein the second ordering is based on input requirements of the ML model.

17. The non-transitory computer readable storage medium of claim 13, wherein the operations further include an interpolation operation to upscale or downscale the image frame.

* * * * *